United States Patent
Gaud et al.

(10) Patent No.: US 8,530,544 B2
(45) Date of Patent: Sep. 10, 2013

(54) MODIFICATION OF THE SURFACE CHEMISTRY OF MACROMOLECULAR SPECIES IN THE PRESENCE OF A CONJUGATED GUANIDINE

(75) Inventors: Vincent Gaud, Pessac (FR); Fabien Rouge, Pessac (FR)

(73) Assignee: Polyrise, Pessac (FR)

( * ) Notice: Subject to any disclaimer, the term of this patent is extended or adjusted under 35 U.S.C. 154(b) by 155 days.

(21) Appl. No.: 12/736,293

(22) PCT Filed: Mar. 27, 2009

(86) PCT No.: PCT/FR2009/000351
§ 371 (c)(1),
(2), (4) Date: Sep. 27, 2010

(87) PCT Pub. No.: WO2009/133264
PCT Pub. Date: May 11, 2009

(65) Prior Publication Data
US 2011/0015304 A1    Jan. 20, 2011

(30) Foreign Application Priority Data
Mar. 28, 2008    (FR) ..................... 08 52029

(51) Int. Cl.
| | | |
|---|---|---|
| B01J 8/02 | (2006.01) | |
| C01B 21/06 | (2006.01) | |
| C08F 283/00 | (2006.01) | |
| C08F 283/04 | (2006.01) | |
| C08F 290/14 | (2006.01) | |
| C08G 18/00 | (2006.01) | |
| C08G 18/08 | (2006.01) | |
| C08G 18/18 | (2006.01) | |
| C08G 63/48 | (2006.01) | |
| C08G 63/91 | (2006.01) | |
| C08G 65/32 | (2006.01) | |
| C08G 73/02 | (2006.01) | |
| C08K 9/00 | (2006.01) | |
| C08L 67/00 | (2006.01) | |
| C08L 71/00 | (2006.01) | |
| C08L 71/02 | (2006.01) | |
| C08L 75/00 | (2006.01) | |
| C08L 83/00 | (2006.01) | |

(52) U.S. Cl.
USPC ........... 523/201; 423/364; 423/659; 523/200; 523/205; 523/206; 523/216; 525/50; 525/403; 525/410; 525/417; 525/452; 525/453; 528/44; 528/53; 528/85

(58) Field of Classification Search
USPC ................ 423/364, 659; 523/200, 201, 205, 523/206, 216; 525/50, 403, 410, 452, 453; 525/417; 528/44, 53, 85
See application file for complete search history.

(56) References Cited

U.S. PATENT DOCUMENTS

| | | |
|---|---|---|
| 5,017,649 A | 5/1991 | Clemens |
| 6,887,517 B1 * | 5/2005 | Cook et al. .................... 427/214 |
| 2008/0003259 A1 | 1/2008 | Salamone et al. |

FOREIGN PATENT DOCUMENTS

| | | |
|---|---|---|
| DE | 101 43 566 | 3/2003 |
| FR | 2 761 691 | 10/1998 |
| WO | WO 93/12157 | 6/1993 |

OTHER PUBLICATIONS

Barreira et al. "Surface modification chemistry based on the electrostatic adsorption of Poly-L-arginine onto alkanethiol modified gold surfaces." Langmuir, vol. 19, 2003, pp. 10324-10331.
Tomalia et al. "Structure control within poly(amidoamine) dendrimers: size, shape and regio-chemical mimicry of globular proteins." Tetrahedron, vol. 59, No. 22, May 26, 2003, pp. 3799-3813.
Gelbard et al. "Polynitrogen strong bases as immobilized catalysts." Reactive and Functional Polymers, vol. 48, 2001, pp. 65-74.
Goodwin et al. "Synthesis of new rigid rod helical polymers through the living polymerization of carbodiimides using titanium (IV) complexes." Macromolcules, vol. 27, 1994, pp. 5520-5522.
Kim. "Hyperbranches polymers 10 years after." Journal of Polymer Science: Part A, vol. 36, 1998, pp. 1685-1698.
Inoue. "Functional dendrimers, hyperbranched and star polymers." Progess in Polymer Science, vol. 25, 2000, pp. 453-571.

* cited by examiner

*Primary Examiner* — Patrick Niland
(74) *Attorney, Agent, or Firm* — Jacobson Holman PLLC

(57) ABSTRACT

The present invention relates to a method for preparing macromolecular species with a modified surface, comprising a step (e) in which macromolecular species (M), initially carrying —OH and/or —SH functions, are brought into contact with: a catalyst (C) carrying at least one conjugated guanidine function; and reactive species (E), comprising reactive groups including: (i) at least one group including an a,b-unsaturated carbonyl group C=C—C=O and/or an a,b-unsaturated thiocarbonyl group C=C—C=S; and/or (ii) at least one heterocyclic group comprising from 3 to 5 ring members, said group being selected from cyclic ethers, cyclic thioethers and aziridine rings; and/or (iii) at least one group selected from isocyanate —N=C=O or thioisocyanate —N=C=S groups, and trivalent groups of formula >C=CZ—, where Z is an electron-withdrawing group. The invention also relates to the macromolecular species with a modified surface that are obtained in this context.

20 Claims, No Drawings

MODIFICATION OF THE SURFACE CHEMISTRY OF MACROMOLECULAR SPECIES IN THE PRESENCE OF A CONJUGATED GUANIDINE

This is a national stage of PCT/FR09/000351 filed Mar. 27, 2009 and published in French, which has a priority of French no. 0852029 filed Mar. 28, 2008, hereby incorporated by reference.

The present invention relates to novel macromolecular species which are in particular suitable as additives in aqueous or nonaqueous complex media (such as, for example, inks, paints, varnishes or adhesive compositions), and the surface functionality of which is variable to a large extent depending on the desired application.

More specifically, the invention also relates to a method for synthesizing such macromolecular species.

For the purpose of the present description, the term "macromolecular species" is intended to mean inorganic, organic or hybrid inorganic and organic compounds which are dispersible in a liquid or gelled composition in the form of dispersed objects (particles or particle aggregate) having sizes of at least 5 nm, more preferably of at least 10 nm, and generally of less than 1 mm, these sizes being generally greater than 15 nm, most often greater than 20 nm, for example between 25 nm and 100 microns, and in particular between 50 nm and 10 microns.

For the purpose of the present invention, the notion of macromolecular species includes both polymers (in particular polymers with a branched structure) and inorganic particles (in particular inorganic particles with a surface modified with organic groups).

It is well-known practice to incorporate macromolecular species of the abovementioned type into compositions of ink, paint, varnish or adhesive type, as a filler or additive, so as to confer on said compositions specific rheological properties (for regulating viscosity, for example) or else particular functionalities (mechanical strength of films obtained from the composition, coloration of the composition, drying speed, adhesive nature of the composition and in particular affinity for given substrates, such as PMMA, polycarbonate, steel, metals or glass).

A recurring problem faced with the use of macromolecular additives of the abovementioned type is that of the dispersion within the complex compositions into which they are introduced, which often proves to be difficult to obtain with any real efficiency. However, without efficient dispersion, the additive is not able to perform its function optimally. On the contrary, a poor dispersion can even, in certain cases, be detrimental to the properties of the composition.

Another drawback associated with the use of macromolecular additives is that of the increase in viscosity of the compositions in which these additives are used. Macromolecular additives in fact generate viscosities which can be very high and which are detrimental, for example, to the handlebility of the compositions, thereby prohibiting their use in certain applications.

An objective of the present invention is to provide macromolecular species with an adaptable functionality, which will allow efficient dispersion within complex compositions such as inks, paints, varnishes or adhesives, and the incorporation of which into such compositions preferably does not induce too great an increase in the viscosity.

To this effect, according to a first aspect, the subject of the present invention is a method for preparing macromolecular species with a modified surface, comprising a step (e) in which macromolecular species (M), initially carrying —OH and/or —SH functions, are brought into contact with:
- a catalyst (C) carrying at least one conjugated guanidine function; and
- reactive species (E), comprising (among other possible groups) reactive groups including:
  (i) at least one group including an α-β-unsaturated carbonyl group C=C—C=O (for example, an acrylic, methacrylic or acrylamide group) and/or an α-β-unsaturated thiocarbonyl group C=C—C=S; and/or
  (ii) at least one heterocyclic group comprising from 3 to 5 ring members (preferably 3 or 4 ring members), said group being selected from cyclic ethers, cyclic thioethers and aziridine rings; this heterocyclic group preferably being at least one epoxy, thioepoxy or aziridine group, and more preferably at least one epoxy or thioepoxy group; and/or
  (iii) at least one group selected from isocyanate —N=C=O or thioisocyanate —N=C=S groups, and trivalent groups of formula >C=CZ—, where Z is an electron-withdrawing group (for example, a 4-nitrophenyl, cyano or —C=N— group).

In step (e) of the method of the invention, the surface of the macromolecular species (M) initially carrying —OH and/or —SH functions is modified with the reactive species (E), in the presence of the catalyst (C) carrying at least one conjugated guanidine function.

For the purpose of the present description, the term "conjugated guanidine function" is intended to mean a guanidine function carrying an unsaturation in the alpha-position with respect to the nitrogen of its imine group.

In other words, a catalyst (C) carrying a conjugated guanidine function is, for the purpose of the present description, a compound carrying a function corresponding to the following schematic formula:

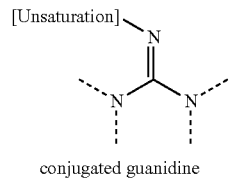

conjugated guanidine

In a conjugated guanidine according to the invention, the presence of the unsaturation in the alpha-position with respect to the nitrogen of the imine group confers, in particular, a considerable basicity on the guanidine, with a pKa much higher than the pKa of an unconjugated guanidine, the pKa of a conjugated guanidine generally being greater than or equal to 23 (typically about 25), compared to a pKa of about 12 for an unconjugated guanidine.

Step (e) of the method of the invention, carried out in the presence of a catalyst carrying at least one conjugated guanidine function of the abovementioned type, results in a specific modification of the surface of the macromolecular species (M). Schematically, covalent grafting of the reactive species (E) onto the macromolecular species (M) takes place by reaction of the reactive groups carried by the species (E) with the —OH and/or —SH groups initially carried by the macromolecular species.

In the context of the present invention, the studies by the inventors have made it possible to demonstrate that the macromolecular species with a modified surface obtained according to step (e) are found to be particularly suitable for dispersion in compositions of ink, paint, varnish or adhesive type and, in general, do not increase the viscosity of the compositions into which they are introduced too drastically.

In addition, another advantage of the method of the present invention is that it makes it possible to modulate to a very large degree the surface functionality of the modified macromolecular species derived from step (e), it being possible to obtain these very simply, by adjusting the nature of the reactive species (E) used. The method of the invention thus makes it possible to obtain, custom-made, macromolecular species suitable for targeted applications.

With the proviso that it comprises at least one conjugated guanidine function of the abovementioned type, the catalyst (C) which is used in step (e) of the method of the invention can vary to a very large extent.

According to one advantageous embodiment of the invention, the catalyst (C) used in the method of the invention comprises at least one conjugated bis-guanidine function.

For the purpose of the present description, the term "conjugated bis-guanidine function" is intended to mean a function including a conjugated structure comprising five nitrogen atoms, corresponding to the following formula:

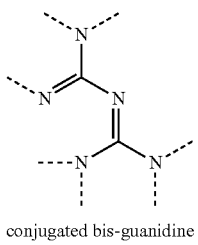

conjugated bis-guanidine

According to one particular embodiment which is found to be generally very suitable for implementing the method of the invention, use is made of a catalyst (C) carrying a conjugated bis-guanidine function corresponding to the following formula (I):

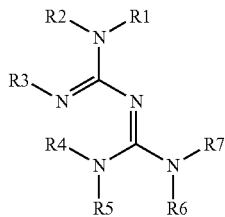

where each of the R1 to R7 groups is, independently of the other groups:
a hydrogen atom; or
a cyano —CN group; or
a linear or branched, saturated or unsaturated, hydrocarbon-based chain which is optionally completely or partially cyclized, which is optionally substituted and which is optionally interrupted with one or more heteroatoms (O, S, N, P or Si, for example) and/or with groups carrying heteroatoms, such as carboxy, amide or carbamate (for example, with divalent groups —C(=O)O—, —OC(=O)—, —O—C(=O)—O—, >N—C(=O)—, —C(=O)—N<, >N—C(=O)—O—, —O—C(=O)—N<, —C=N—, —N=C—, this chain typically being:

a linear or branched alkyl, alkenyl or alkynyl group advantageously comprising from 1 to 12 carbon atoms, for example from 1 to 6 carbon atoms, this alkyl, alkenyl or alkynyl group being optionally substituted, for example, with an alkoxy group;

a cycloalkyl group advantageously comprising from 6 to 18 carbon atoms, optionally substituted, for example, with at least one alkyl or alkoxy group;

an aryl group advantageously comprising from 6 to 18 carbon atoms, optionally substituted, for example, with at least one alkyl or alkoxy group;

an optionally aromatic heterocycle, comprising one or more atoms chosen from S, O or N;

an alkylaryl or arylalkyl group advantageously comprising from 8 to 18 carbon atoms, where the aryl part is optionally substituted, in particular, with an alkyl or alkoxy group;

an ester, amide or carbamate group; or a polymer chain optionally carrying other guanidine groups (preferably conjugated guanidine groups, where appropriate).

The catalysts corresponding to formula (I) can be used as such in the method of the invention, for example in the solubilized or dispersed state in a solvent or dispersing (preferably nonaqueous) medium, or as a mixture with the macromolecular species (M) and the reactive species (E) in the absence of any solvent or dispersant. Alternatively, they can also be used in the supported state.

Particularly advantageously, it is possible to use, in the method of the invention, a catalyst (C) having the abovementioned formula (I) where each of the R1 to R7 groups represents, independently of the other groups, a hydrogen atom, an alkyl group comprising from 1 to 4 carbon atoms, for example a methyl, ethyl, propyl, isopropyl or t-butyl group, or a cyano group.

The catalysts (C) having the abovementioned formula (I) where R1 and R3 are alkyl groups comprising from 2 to 4 carbon atoms (in particular ethyl, propyl, isopropyl or t-butyl groups) and where R2, R4, R5, R6 and R7 are hydrogen atoms or else alkyl groups comprising 1 or 3 carbon atoms (for example, a methyl or ethyl group) prove to be particularly advantageous.

According to one specific embodiment, illustrated in the examples given at the end of the description, use may, for example, be made of a catalyst (C) corresponding to the following formula (Ia):

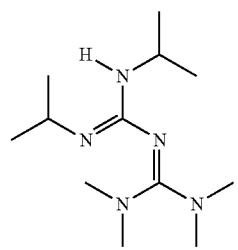

Another example of catalyst (C) that can be envisioned in the context of the present invention is the conjugated guanidine of formula (Ib) below:

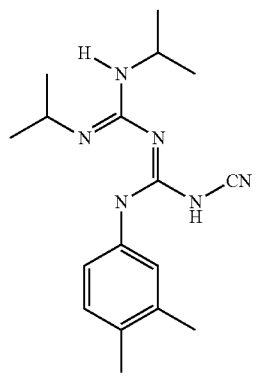

(Ib)

According to another possible embodiment, the catalyst (C) used in step (e) of the method of the invention carries two guanidine functions conjugated to one another.

For the purpose of the present description, the term "guanidines conjugated to one another" is intended to mean two conjugated guanidine functions of the type defined above, where the alpha unsaturations of each of the imine groups of the two guanidines are linked to one another in the form of an unsaturated chain (optionally completely or partially cyclized) allowing conjugation between the two guanidines.

Thus, a catalyst (C) carrying guanidines conjugated to one another is, for the purpose of the present description, a compound carrying a function corresponding to the following schematic formula:

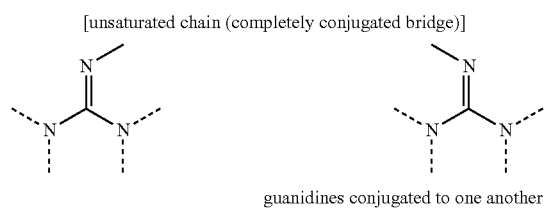

guanidines conjugated to one another

In the catalysts (C) comprising guanidines conjugated to one another, the unsaturated chain which links the two guanidines and allows conjugation thereof (completely conjugated bridge) is, for example:

- a completely or partially cyclized, linear or branched, unsaturated hydrocarbon-based chain with total pi delocalization, for example an alkenylaryl, arylalkenyl, alkenylarylalkenyl or arylalkenylaryl group, these groups optionally comprising heteroatoms such as N and P and these groups being optionally functionalized, in particular with a pendant guanidine group, this pendant guanidine group then being advantageously conjugated to the two guanidine groups linked by the carbon chain;
- an aryl group preferably comprising from 6 to 18 carbon atoms, optionally substituted, in particular, with a guanidine group (advantageously conjugated to the two guanidine groups linked by said aryl group) and/or with an alkyl or alkoxy group;
- a heteroaryl group comprising heteroatoms such as O, N and S and advantageously from 5 to 18 carbon atoms.

In the context of this embodiment, use may, for example, be made, as catalyst (C), of the compound of formula (I') below:

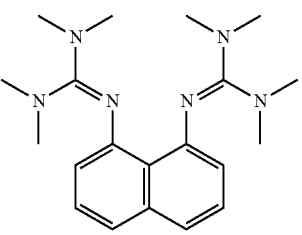

(I')

According to yet another possible embodiment, a catalyst (C) carrying several conjugated guanidine functions can be used. In this case, these conjugated guanidine functions are preferably, but not necessarily, conjugated to one another. In the context of this embodiment, use may in particular be made, as catalyst (C), of:

- a polymer comprising a series of units including units carrying conjugated guanidine functions, preferably having a molecular mass of less than 50 000 g/mol, for example between 5 000 g/mol and 15 000 g/mol. A method for preparing polymers of this type is described in *Macromolecules*, vol. 27, pp. 5520-5522. As suitable polymer, mention may also be made of polymers carrying conjugated guanidine functions, such as the particles of weakly crosslinked polystyrene, carrying conjugated bis-guanidine functions, described in *Reactive and Functional Polymers*, vol. 48, pp. 65-74;
- particles comprising conjugated bis-guanidine functions on their surface, these particles being most commonly inorganic oxide-based (silica and/or alumina, in particular), and typically having sizes of between 5 and 500 nm. Such particles can, for example, be obtained by grafting guanidine onto the inorganic oxide particles (for example according to the embodiment described in EP 168 167) and then reacting the resulting grafted particles with a carbodiimide, for example N,N'-dicyclohexylcarbodiimide, preferably in an aprotic solvent such as DMF, for example.

Irrespective of the exact nature of the catalyst (C) used in step (e), the nature of the macromolecular species (M) used in the method of the invention can vary to a very large extent.

According to a first alternative of the invention, the macromolecular species (M) treated in step (e) comprise (or consist of) polymers with a dendritic structure, initially carrying —OH and/or —SH groups.

In the present description, when reference is made to macromolecular species treated in a step and these macromolecular species are said to be "initially carrying —OH and/or —SH groups", the term "initially" means that said macromolecular species are carrying —OH and/or —SH groups at the beginning of the treatment step, and that all or some of these groups may be consumed during this step (in which case, the macromolecular species, once modified, can ultimately either comprise residual —OH and —SH groups, or no longer comprise such groups).

Moreover, in the sense in which it is used here, the expression "polymer with a dendritic structure" denotes any polymer, having a branched structure, which can be obtained by polymerization (or copolymerization) of organic monomer units having a functionality of greater than 2. Examples of such polymers with a dendritic structure are dendrimers, which have a regular and controlled dendritic structure, of the type of those described in particular in *Progress in Polymer Science*, vol. 25, pp. 453-571. Other polymers with a dendritic structure less regular than that of dendrimers can be used according to the invention, for example "hyperbranched" polymers of the type described, for example, in the *Journal of Polymer Science*, Part A, vol. 36, pp. 1685-1698.

Hyperbranched-type polymers are in general preferred to dendrimers, in particular since they are less expensive to prepare.

It should be noted here that the catalyst (C) which is used in step (e) of the method of the invention is a catalyst which is also suitable for the preparation of hyperbranched polymers from monomers which have a functionality of greater than two and which carry —OH or —SH functions and reactive functions, in particular of the type of the reactive functions carried by the reactive species (E) used in step (e). More generally, the catalyst (C) also proves to be suitable for catalyzing the polymerization of monomers which have a functionality of greater than 2 and which carry reactive functions such as ester (—C(=O)O—), thioester (—C(=S)O—), amide (—C(=O)N<), carbamate and thiocarbamate (—O—C=O—N<, —O—C=S—N<) functions, or alternatively phosphate (—O—P(=O)(—O—)$_2$) or sulfate (—S(=O)$_2$—O—) functions.

Thus, according to one advantageous embodiment of the invention, the macromolecular species (M) treated in step (e) of the method of the invention can be polymers with a dendritic structure that are obtained by polymerization of monomers which have a functionality of greater than 2, in the presence of a catalyst (C) as defined above.

In this particular situation, the method of the invention generally comprises the following steps (e1) and (e2):

(e1) a polymer (P) with a dendritic structure is formed by polymerization, catalyzed by the catalyst (C), of monomers comprising:
at least two OH and/or SH functions and at least one reactive function; and/or
at least two reactive functions, and at least one OH and/or SH function;
where said reactive functions carried by the monomers are selected from the groups including an α,β-unsaturated carbonyl group C=C—C=O (for example, acrylic, methacrylic or acrylamide groups) and/or an α,β-unsaturated thiocarbonyl group C=C—C=S, cyclic ether groups comprising from 3 to 5 ring members, cyclic thioether groups comprising from 3 to 5 ring members or aziridine rings comprising from 3 to 5 ring members; isocyanate groups —N=C=O, thioisocyanate groups —N=C=S, trivalent groups of formula >C=CZ— where Z is an electron-withdrawing group, in particular of the abovementioned type, and esters, thioester, amide, carbamate, thiocarbamate, phosphate or sulfate functions;
then
(e2) the resulting polymer (P) with a dendritic structure, which carries peripheral —OH or —SH functions, is brought into contact with reactive species (E) as defined above and the catalyst (C).

In this succession of steps, in step (e1), a polymer core is prepared using the catalyst (C) and then, in step (e2), this polymer core is functionalized in the presence of the same catalyst (C). Generally, it is the same catalyst (C) which is used in steps (e1) and (e2).

According to one advantageous embodiment of the abovementioned steps (e1) and (e2), the reactive functions carried by the monomers used in step (e1) are groups including a carbonyl group, in particular an ester group (advantageously an alkyl ester group, in particular a —COOCH$_3$ or —COOC$_2$H$_5$ group).

Moreover, the monomers used in step (e1) are advantageously compounds carrying (i) at least one reactive function of the abovementioned type (for example, but not necessarily, a group including a carbonyl group) and (ii) at least two —OH and/or —SH functions.

Even more advantageously, the monomers of step (e1) comprise at least one group including a carbonyl group (preferably, an ester function of the abovementioned type and at least two —OH functions).

Thus, by way of advantageous monomer in step (e1), mention may in particular be made of the compound corresponding to the following formula:

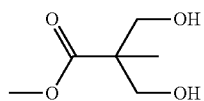

Other examples, by way of indication, of monomers that can be envisioned in step (e1) are:
the monomer having the following formula:

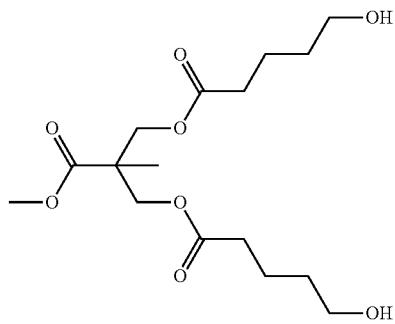 [SMILES: COC(=O)C(C)(COC(=O)CCCCO)COC(=O)CCCCO]

(which can in particular be obtained from 2,2-bis(hydroxymethyl)propionic acid and ☐caprolactone in the presence of tin octanoate, and then esterification of the product obtained, with methanol);

methyl 3,5-dihydroxybenzoate, having the formula:

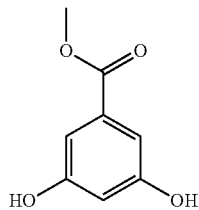

The polymerization carried out in step (e1) mentioned above is advantageously carried out by anionic polymerization. In this case, step (e1) is generally carried out in the presence of a strong base as a cocatalyst, this strong base advantageously being selected from alkoxide salts such as tBuOK, or alternatively EtONa.

When steps (e1) and (e2) above are carried out, a polymer P which has a dendritic structure, of hyperbranched type, and which carries peripheral —OH and/or —SH functions is obtained at the end of step (e1). This polymer P can therefore be treated according to the modification method of the invention, which is done in step (e2), where the polymer is brought into contact with reactive species (E) in the presence of the catalyst (C).

In the context of this embodiment of the invention, given the specific use of the catalyst (C) in step (e1), step (e2) can be carried out very easily, simply by adding the species (E) to the reaction medium obtained at the end of step (e1), optionally with further addition of catalyst (C).

As a result, the implementation of steps (e1) and (e2) proves to be particularly advantageous insofar as it does not require purification or extraction steps between the preparation of the polymer in step (e1) and the modification of said polymer in step (e2). This possibility of carrying out the two steps according to a "one pot" pathway results in particular in a reduction in the costs of the method and in time being saved.

According to a second alternative of the invention, the macromolecular species (M) treated in step (e) comprise (or consist of) inorganic particles which have —OH or —SH groups at the surface.

According to this alternative, the particles are in general based on an inorganic oxide (this is intended to mean that the particles are completely or partially made up of at least one inorganic oxide, preferably at least partially accessible at the surface of the particle). The particles used are, for example, silica-based, alumina-based, or alternatively zirconium oxide-based or titanium oxide-based. The constitutive oxide(s) of the particles can optionally be doped oxides or oxides in the form of solid solutions (silica or zirconium oxide doped with europium or yttrium, for example). According to one specific embodiment, silica particles can be used, for example in the form of a nonaqueous sol (for example an alcoholic sol).

More generally, any inorganic particle can be used in the context of the first variant with the proviso that said particles have, at the surface, free —OH or —SH groups capable of reacting with the reactive species (E) in step (e) of the method. It is possible for —OH groups to be groups naturally present on the particles used (this is the case, for example, for particles of silica or of metal oxides such as alumina). Nevertheless, more generally, the particles used are grafted with —OH or —SH groups, or with organic chains carrying free —OH or —SH groups, prior to step (e). The introduction (grafting) of these —OH or —SH groups at the surface of the metal oxide particles can be carried out according to methods known to those skilled in the art. For example, starting from inorganic particles carrying surface groups of Si—OH or Al—OH type, hydrolysis-condensation reactions can be carried out using alkoxysilanes carrying —OH or —SH groups, containing at least one hydrocarbon-based chain bonded, via a carbon atom, to the silicon atom.

The inorganic particles used can be both isotropic (spherical for example) and anisotropic (in the form of rods or flakes, in particular).

Moreover, when inorganic particles are used as macromolecular species (M) in step (e) of the method of the invention, it is in general preferred to use them in a form dispersed in a dispersing medium, which is preferably anhydrous (alcohol or other organic solvent), where the particles are in the form of dispersed objects (isolated particles and/or particle aggregates), having a size of preferably between 5 nm and 100 microns, these dimensions generally being greater than 10 nm, most commonly greater than 20 nm, for example between 25 nm and 50 microns, in particular between 30 nm and 10 microns.

More generally, molecular species (M) other than the polymers with a dendritic structure and the inorganic particles mentioned above can be used in step (e). For example, it is possible to use, as macromolecular species (M), organic particles, for instance polymer microbeads (for example polyurethane microbeads surface-functionalized with free —OH groups) or else inorganic species in the gelled state (silica gel, for example). It is, for example, possible to take advantage of the method of the invention in order to modify the properties of a film deposited on a surface (film of ink, varnish, paint or adhesive, for example) during the hardening thereof.

Independently of their exact nature, the macromolecular species (M) used in step (e) preferably carry hydroxyl groups —OH. In this context, the macromolecular species (M) can carry a mixture of —OH species and —SH species, or else only —OH functions.

In general, irrespective of the exact nature of the macromolecular species (M), of the reactive species (E) and of the catalyst (C) which are used in the method of the invention, it is most commonly preferred, in step (e) of bringing the macromolecular species (M), the reactive species (E) and the catalyst (C) into contact, for the molar ratio (catalyst/reactive groups), of the amount of catalyst (C) relative to the total amount of reactive groups present on the reactive species (E), to be between 0.05% and 10%, more advantageously between 0.2% and 5%, and even more advantageously between 0.5% and 2.5%.

The molar ratio (reactive groups/—OH or —SH groups) of the total amount of reactive groups present on the reactive species (E) relative to the total amount of —OH and —SH groups present on macromolecular species (M), is, for its part, to be adjusted in step (e), according to the amount of modified functions that it is desired to introduce on the surface of the macromolecular species (M). In the most general case, depending on whether quantitative or partial grafting is desired, this molar ratio (reactive groups/—OH or —SH groups) varies most commonly in the range of from 5% to 150%.

When the species (E) are monofunctional (that is to say carry a single reactive group per molecule), the molar ratio (reactive groups/—OH or —SH groups) is more preferably between 20% and 110%, for example between 25% and 100%.

In the more specific case where multifunctional reactive species (E) (that is to say carrying two reactive groups or more per molecule) are used, step (e) is capable of resulting in crosslinking of the species (M) with one another. In order to avoid the coupling reactions responsible for this crosslinking, it is often preferable to carry out step (e) with a molar ratio (reactive groups/—OH or —SH groups) of greater than or equal to 75%, advantageously greater than or equal to 90%, for example between 100% and 150%. If, on the contrary, the intention is to promote coupling between the species (M), the molar ratio (reactive groups/—OH or —SH groups) used in step (e) will preferably be selected below 50%, and preferably below 30%, for example between 5% and 25%.

In certain cases, it may be advantageous to carry out step (e), of bringing the macromolecular species (M), the reactive species (E) and the catalyst (C) into contact, in the presence of a cocatalyst advantageously selected from strong bases such as, for example, alkoxide salts such as tBuOK or EtONa. The use of such a cocatalyst, though it proves to be advantageous in certain cases, is not systematically required in the context of step (e). Thus, step (e) can absolutely be carried out without using any catalytic species other than the catalyst (C).

It may, moreover, prove to be advantageous to carry out step (e) in the presence of a stabilizing agent, such as 3,5-ditert-butyl-4-hydroxytoluene (BHT), methyl ether hydroquinone (MEHQ) or hydroquinone, which make it possible in particular to inhibit a spontaneous reaction of free-radical polymerization of the reactive species (E), which might otherwise take place (in particular when step (e) is carried out at a temperature above 90° C.).

Moreover, in step (e), the macromolecular species (M), the reactive species (E) and the catalyst (C) can be brought into contact by placing the various compounds in a solvent and/or dispersing medium. In this situation, the solvent and/or dispersing medium used is preferably a medium free of water (and which, advantageously, also does not comprise any protic or hydroxylated solvent), in particular so as not to interact with the reactions which take place in step (e). Solvent and/or dispersing media that are suitable in step (e) include, in particular, THF (tetrahydrofuran), ethyl acetate, DMSO (dimethylsulfoxide), toluene and xylene and mixtures thereof. Some solvents should generally be discarded in the context of carrying out step (e): this is in particular the case of DMF, which in general is found to be very unsuitable according to the invention.

Alternatively, according to one embodiment which often proves to be advantageous, in step (e), the macromolecular species (M), the reactive species (E) and the catalyst (C) can be brought into contact without adding either solvent or dispersant to the compounds (M), (E) and (C). This specific embodiment can be envisioned with the proviso that the catalyst (C) is efficiently solubilized or dispersed in the mixture of compounds (M), (E) and (C). To this effect, it is preferable to use species (E) which are capable of acting as solvent and/or dispersant (in this context, polymers having a molar mass of less than 10 000 g/mol can in particular be used as species (E)).

Furthermore, very generally, in step (e), the macromolecular species (M), the reactive species (E) and the catalyst (C) are most commonly brought into contact at a temperature of between 80° C. and 160° C., more preferably between 90° C. and 140° C.

Depending on the nature of the reactive species groups (E) used in step (e), a distinction can be made between various major variants of the method of the invention, namely:

Variant 1:
The Reactive Species (E) Specifically Comprise α,β-Unsaturated Carbonyl C=C—C=O and/or α,β-Unsaturated Thiocarbonyl C=C—C=S Groups According to this first variant of the method of the invention, which makes it possible to modulate the surface functionalization of the species (M) over a wide range, the reactive species (E) which are used in step (e) are compounds which preferably comprise α,β-unsaturated carbonyl groups C=C—C=O and/or at least one α,β-unsaturated carbonyl group C=C—C=O.

Preferably, in the context of this first variant, the reactive species (E) are compounds comprising at least one acrylate or methacrylate group.

According to one particularly advantageous embodiment of the first variant, the reactive species (E) are compounds corresponding to the following formula (II):

where:
the R8 group is a linear or branched alkyl group, or a linear or branched, saturated or unsaturated, hydrocarbon-based chain which is optionally completely or partially cyclized, optionally substituted, and optionally interrupted with one or more heteroatoms selected from N, O, S, P and Si (for example, an alkenyl, cycloalkyl, aryl, alkylaryl or arylalkyl group), R8 preferably being an alkyl group; and the R9, R10 and R11 groups are each, independently, a hydrogen atom, a linear or branched alkyl group, or a linear or branched saturated or unsaturated, hydrocarbon-based chain which is optionally completely or partially cyclized, optionally substituted, and optionally interrupted with one or more heteroatoms selected from N, O, S, P and Si.

Advantageously, in the compounds corresponding to the abovementioned formula (II), the R8 group is a methyl or ethyl group.

Compounds which especially prove to be particularly suitable as reactive species (E) according to the first variant of the invention are the compounds corresponding to the abovementioned formula (II), in which:
the R8 group is an alkyl group comprising from 1 to 12 carbon atoms, preferably less than 6 carbon atoms (for example, a methyl or ethyl group);
the R9 group is a hydrogen atom or a methyl group; and
each of the R10 and R11 groups is, independently, a hydrogen atom or an alkyl, alkenyl, cycloalkyl, aryl, alkylaryl or arylalkyl group preferably comprising from 1 to 18 carbon atoms, for example from 2 to 8 carbon atoms.

The studies by the inventors have demonstrated, in the context of the present invention, that, under the conditions of implementation of the first variant of the method of the invention, an advantageous functionalization of the surface of the macromolecular species (M) is obtained, which can, as selected, be used:
either simply for functionalizing all or part of the surface of the macromolecular species (M),
or, if desired, for functionalizing all or part of the surface of the species (M), while at the same time also obtaining coupling of the species (M) to one another by means of coupling reactions.

More specifically, it is found that the use of reactive species (E) specifically comprising groups including an α,β-unsaturated carbonyl C=C—C=O (groups of acrylate or methacrylate type), results in two possible reactions with the —OH and/or —SH groups present on the species (M), namely:
an addition reaction of Michael addition type; and/or
a transesterification reaction.

Typically, when the species (M) carry —OH groups, and reactive species (E) corresponding to formula (II) mentioned above are used, the reaction between macromolecular species (M) and these reactive species (E) and the catalyst C result in the conversion of at least some of the —OH groups of the species M into functions of formula —O—CR10R11-CR9-COOR8 (by Michael addition) and/or into functions of formula —O—(C=O)—CR9=CR10R11 (by transesterification, with joint formation of an alcohol R8-OH).

Likewise, when the species (M) carry —SH groups, and reactive species (E) corresponding to formula (II) mentioned above are used, the reaction between macromolecular species (M) and these reactive species (E) and the catalyst C results in the conversion of at least some of the —SH groups of the species M into functions of formula —S—CR10R11-CR9-COOR8 (Michael addition) and/or into functions of formula —S—(C=O)—CR9=CR10R11 (by transesterification, with joint formation of a thiol R8-SH).

Phenomena similar to those described above for the reactive species (E) carrying an α,β-unsaturated carbonyl group are observed when the reactive species (E) comprise α,β-unsaturated thiocarbonyl groups C=C—C=S.

The inventors have now demonstrated that, under the conditions of the invention, step (e) as carried out in the context of the first variant most commonly results systematically in Michael addition reactions, and that the transesterification reactions can, for their part, be prevented or, on the contrary, promoted by adjusting the reaction parameters of step (e), as is explained hereinafter.

The inventors have also demonstrated that, when transesterification reactions take place, they most commonly result in coupling phenomena between the species (M) in addition to the surface functionalization. This coupling effect appears to be explained at least partly by the fact that the functions formed by transesterification reaction on the species (M) are functions capable of reacting, according to a Michael addition reaction, with —OH and/or —SH groups present in the medium. In the particular case of the use of reactive species (E) having the abovementioned formula (II), these functions formed by transesterification reaction are —O—(C=O)—CR9=CR10R11 or —S—(C=O)—CR9=CR10R11 functions. A function of this type carried by a first species (M) can react with an —OH and/or —SH group carried by another species (M), so as to form a covalent bond between these two species, which are thus coupled (via bridging divalent groups of formula —O—CR10R11-CR9-C(=O)—O—; —O—CR10R11-CR9-C(=O)—S—; —S—CR10R11-CR9-C(=O)—O—; and/or —S—CR10R11-CR9-C(=O)—S—).

This bridging effect between the species (M) can in particular be used to advantage for increasing the molecular mass of the species obtained. The embodiments of the invention resulting in such a bridging effect are found to be in particular suitable for the preparation of high-molecular-weight polymers with a dendritic structure.

Conversely, if, in the method of the invention, conditions are used which are unfavorable to the transesterification reactions, a functionalization of all or part of the surface of the species (M) with functions formed by Michaël addition (—O—CR10R11-CR9-COOR8 or —S—CR10R11-CR9-COOR8 functions, in the particular case of the use of reactive species (E) of formula (II)) are essentially (or even exclusively in certain cases) obtained, essentially without any coupling phenomenon between the species (M).

In order to promote the obtaining of coupling between the species (M) in the context of the first variant of the method of the invention, at least one of the two conditions hereinafter can in particular be used (and preferably the two together):

carrying out step (e) under a pressure of 0.7 to 1 bar (i.e. from $7 \times 10^4$ to $10^5$ Pa)

A pressure included within this range proves to be sufficiently weak to provide initial functionalization of the species (M) by transesterification, which is a prerequisite for the coupling reaction. However, it is at the same time sufficiently high to disadvantage the transesterification reaction to the benefit of the Michael addition reaction, which is the second important condition for the coupling to actually take place. This is because the low pressure used facilitates the continuous extraction of the alcohols and/or thiols formed by the transesterification reaction. The equilibrium of the transesterification reaction is thus shifted and the transesterification reaction is then favored (this effect is most particularly clear when compounds (II) in which R8 is an ethyl or a methyl are used, the alcohol formed then being methanol or ethanol, very readily extractable under reduced pressure).

It should be noted that, more generally, coupling can be obtained, in certain cases, at pressures around atmospheric pressure, typically between 0.7 and 2 bar; however, such coupling does not systematically take place when step (e) is carried out between 1 and 2 bar.

carrying out step (e) with a species (E)/species (M) molar ratio of at most 75%

The term "species (E)/species (M) molar ratio" is intended to mean the molar ratio of the amount of reactive groups present on the species (E) relative to the amount of —OH and/or —SH groups carried by the species (M). In order to promote the coupling as much as possible, this molar ratio is preferably less than or equal to 50%, more advantageously less than or equal to 40%, for example between 10% and 30%.

It should be noted that coupling can be obtained for species (E)/species (M) molar ratios ranging up to 100%, but that coupling is not, however, systematic when the ratio is between 75% and 100%.

Moreover, when it is desired to obtain coupling between the species (M) in the context of the first variant of the method of the invention, it most commonly proves to be preferable to carry out step (e) at a temperature of between 70° C. and 180° C., more preferably between 90° C. and 140° C., for example between 95° C. and 135° C.

Conversely, when it is desired to prevent coupling phenomena between the species (M) in the context of the first variant of the method of the invention, it is indicated to use at least one of the two conditions hereinafter (and preferably both), which have the effect of inhibiting the transesterification reaction:

carrying out step (e) under a pressure of greater than 2 bar (i.e. greater than $2 \times 10^5$ Pa), preferably between 2 and 10 bar (i.e. between $2 \times 10^5$ Pa and $10^6$ Pa)

At such a pressure, the extraction of the alcohols and/or thiols formed by the transesterification reaction is disadvantaged, thereby inhibiting the transesterification reaction. Advantageously, in order to obtain this effect, it is typically possible to work at between 2 and 5 bar. (The inhibition of the transesterification reaction is all the more marked if the pressure is high, in particular above 2.5 bar and even more particularly above 3 bar; however, in particular for reasons of cost of the method, it is often preferable to carry out the method at a relatively moderate pressure, and pressures of greater than 5 bar are not generally found to be required).

It should be noted that modification reactions without coupling can be observed at pressures of less than 2 bar (for example, at a slight overpressure, in particular at pressures of greater than 1.1 bar). Inhibition of the coupling is not, however, systematic at pressures of less than 2 bar.

carrying out step (e) with a species (E)/species (M) molar ratio of at least 100%

In order to inhibit the coupling reactions as much as possible, it is advantageous for this molar ratio (molar ratio of the amount of reactive groups present on the species (E) relative to the amount of —OH and/or —SH groups carried by the species (M)) to be between 100% and 125% when the species (M) are monofunctional (that is to say carry a single —OH or SH reactive group) and greater than 150% (for example between 150% and 250%) when the species (M) are polyfunctional (that is to say carry at least two —OH and/or SH reactive groups).

It should be noted that modification reactions without coupling can be obtained in certain cases for species (E)/species (M) molar ratios of less than 100%, in particular between 75% and 100%. Nevertheless, in this range, inhibition of the coupling reactions is not systematic.

Furthermore, when it is desired to inhibit the coupling reactions between the species (M) in the context of the first variant of the method of the invention, it is most commonly found to be preferable to carry out step (e) at a temperature of above 100° C., more preferably above 120° C., advantageously above 140° C., this temperature nevertheless most commonly remaining below 250° C., preferably below 200° C., or even below 180° C., which makes it possible in particular to limit the costs of the method and not to affect the stability of the organic compounds used.

It should, moreover, be noted that the implementation of the first variant of the method of the invention also makes it possible, in certain cases, to obtain the formation of polymer chains (polyacrylates or polymethacrylate in particular) on the surface of the macromolecular species (M). To this effect, the macromolecular species (M), the reactive species (E) and the catalyst (C) can, for example, be brought into contact in the presence of an anionic polymerization cocatalyst advantageously selected from strong bases such as alkoxide salts (for instance tBuOK, in particular). When the process is carried out with the presence of such an additional cocatalyst, there is most commonly a reaction of anionic polymerization of the species E with the —O—(C=O)—CR9=CR10R11 and/or —S—(C=O)—CR9=CR10R11 groups formed on some of the macromolecular species M, which results in the formation of poly(meth)acrylate end chains on the species (M) at the end of step (e). This effect can be taken advantage of in particular for the formation of linear strands at the periphery of polymers with a dendritic structure or else for the formation of polymer chains on inorganic particles. When an additional anionic polymerization cocatalyst is used in step (e) in order to achieve the abovementioned result, the (cocatalyst/bis-guanidine functions) molar ratio in the reaction medium of step (e) is, in general, preferably between 10% and 100%, and more preferably between 20% and 50%.

According to one specific embodiment, the first variant of the method of the invention can be used to advantage for synthesizing polymers with a dendritic structure, by polymerization of monomers which have a functionality of greater than 2 according to the abovementioned steps (e1) and (e2). In this situation, advantageously, steps (e1) and (e2) of the method of the invention can then be carried out under the following conditions:

(e1) a polymer (P) with a dendritic structure is formed by polymerization of monomers comprising:
  at least one ester, acrylate or methacrylate function; and at least two OH or SH functions; and/or
  at least two functions selected from ester, acrylate or methacrylate functions, and at least one OH or SH function; then (e2) the resulting polymer (P) with a dendritic structure (which carries peripheral —OH or —SH functions) is brought into contact with reactive species E and the catalyst C.

According to this specific embodiment, steps (e1) and (e2) are advantageously carried out in the presence of an alkoxide salt-type anionic polymerization cocatalyst of the abovementioned type.

Variant 2:

The Reactive Species (E) Specifically Comprise Heterocyclic Groups having from 3 to 5 Ring Members, Selected from Cyclic Ethers, Cyclic Thioethers and Aziridine Rings According to this second variant of the method of the invention, the reactive species (E) which are used in step (e) are compounds which specifically comprise, for example as end group:

at least one cyclic ether group comprising from 3 to 5 ring members, namely a group which has the following schematic formula:

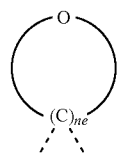

where ne is an integer ranging from 3 to 5, preferably equal to 3 or 4; and/or at least one cyclic thioether comprising from 3 to 5 ring members, namely a group which has the following schematic formula:

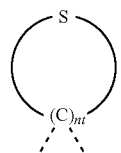

where nt is an integer ranging from 3 to 5, preferably equal to 3 or 4; and/or at least one aziridine ring comprising from 3 to 5 ring members (preferably 3 or 4), namely a group which has the following schematic formula:

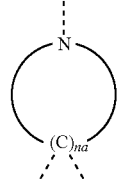

where na is an integer ranging from 3 to 5, preferably equal to 3 or 4.

According to one preferred embodiment of this variant, the reactive species (E) are compounds comprising an epoxy and/or thioepoxy group, which have, respectively, the schematic formulae:

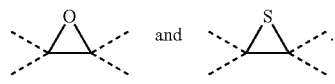

Alternatively, the reactive species (E) can be compounds comprising an aziridine group which has the following schematic formula:

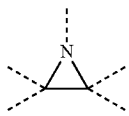

In this situation, these groups present on the species (E) react with the —OH and/or —SH groups present on the species M so as to result in the formation, on the species M, of functions which have the following schematic formulae:

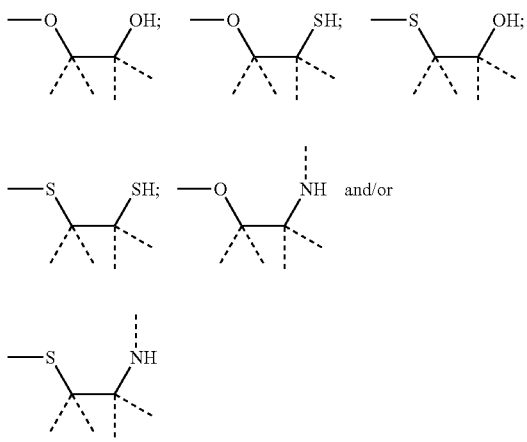

In the context of the present invention, the studies by the inventors have made it possible to establish that the specific use of the catalyst (C) makes it possible to obtain a reaction of controlled opening of strained rings of epoxide and thioepoxide type.

More specifically, it is found that, surprisingly, catalysts comprising bis-guanidine functions prove to be very efficient protonating agents, providing efficient catalysis of the epoxide-type strained-ring opening reaction, but that they do not, however, perform the role of anionic polymerization initiators for compounds of epoxide or thioepoxide type.

As a result, the second variant of the method of the invention is found to be particularly advantageous for functionalizing the surface of molecular species with functions of the following type:

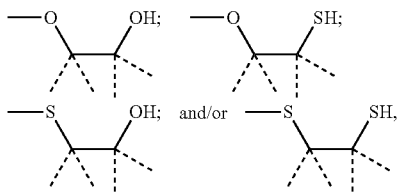

without the risk of formation of polymer chains of polyether or polythioether type at the surface of the species (M). Perfectly controlled functionalization of the species (M) is thus obtained.

Variant 3:
The Reactive Species (E) Comprise Isocyanate —N=C=O and/or Thioisocyanate —N=C=S Groups and/or Trivalent Groups of Formula >C=CZ— where Z is an Electron-Withdrawing Group In this situation, the catalyst (C) of the invention is found to constitute a particularly efficient catalyst for the reaction for transformation of the surface chemistry of the species (M) which is carried out in step (e).

In the context of this variant, the trivalent groups of formula >C=CZ— that can be carried by the reactive species (E) used can vary to a very large extent, with the proviso that the C=C double bond is electron-depleted (by mesomeric and/or inductive effects) by the electron-withdrawing group Z in the alpha-position with respect to this bond.

For the purpose of the present description, an "electron-withdrawing group" preferably has a Hammett constant ($\sigma_p$) greater than or equal to the value of 0.05 (which corresponds in particular to the value of $\sigma_p$ of the phenyl group) in the Hammett constant scale where the $\sigma_p$ of hydrogen is zero and where the $\sigma_p$ of a trifluoromethyl group is 0.53. By way of advantageous electron-withdrawing groups Z according to the invention, mention may in particular be made of substituted phenyl groups, for example 4-nitrophenyl, or else —CN, —C(=O)—, —C(=N—)—, C(=O)—S—, or a thiophene group.

Variant 4:
The Reactive Species (E) Comprise Difunctional Compounds

According to this fourth variant of the method of the invention, compatible with one of the previous ones, the reactive species (E) comprise difunctional compounds comprising at least two reactive groups selected from groups including at least one α,β-unsaturated carbonyl C=C—C=O and/or α,β-unsaturated thiocarbonyl C=C—C=S group, heterocyclic groups comprising from 3 to 5 ring members (cyclic ethers, cyclic thioethers or aziridine rings of the abovementioned type), isocyanate groups, thioisocyanate groups —N=C=S, and groups of formula >C=CZ— where Z is an electron-withdrawing group, as defined above in the present description.

When this variant of the method is implemented, bridging of the species M, following the bringing into contact of the macromolecular species (M), of the reactive species (E) and of the catalyst (C), is obtained. This is because the two groups present on the reactive species (E) have a tendency to react with two —OH and/or —SH groups present on separate macromolecular species.

This variant makes it possible in particular to obtain branched polymers of high molecular mass. In this context, polymers of low molecular mass (for example between 6000 and 8000 g/mol) can typically be used as species (M), step (e) resulting in coupling of these polymers with one another, by virtue of which polymers of higher molecular mass (typically having a molecular mass of at least 12 000 g/mol, for example greater than or equal to 15 000 g/mol) are obtained. It should be noted that the resulting high-mass polymers generally conserve a low viscosity.

In the context of the fourth variant of the method of the invention, use is advantageously made of reactive species (E) which comprise (or which consist of) one or more compounds corresponding to the following general formula (III):

R12—(L)—R13    formula (III)

where:
the R12 and R13 groups, which may be identical or different, are, independently:
a group including an α,β-unsaturated carbonyl group C=C—C=O, preferably an acrylate or methacrylate group; or
a cyclic ether group comprising from 3 to 5 ring members, a cyclic thioether group comprising from 3 to 5 ring members or a cyclic aziridine ring comprising from 3 to 5 ring members, preferably an epoxy, thioepoxy or aziridine group; or
an isocyanate —N=C=O or thioisocyanate —N=C=S group; and
(L) denotes a saturated or unsaturated, divalent hydrocarbon-based group which is optionally completely or partially cyclized, optionally interrupted with one or more heteroatoms chosen from O, N, S, P and Si, and optionally substituted.

According to a more specific embodiment of the fourth variant, reactive species (E) containing more than two reactive groups, for example 3 or 4, can be used. Where appropriate, use may, for example, be made of species (E) comprising compounds having the abovementioned formula (III) in which the group (L) carries at least one additional group R14 selected from groups including an α,β-unsaturated carbonyl group C=C—C=O, cyclic ether groups comprising from 3 to 5 ring members, cyclic thioether groups comprising from 3 to 5 ring members, cyclic aziridine rings comprising from 3 to 5 ring members, and isocyanate and thioisocyanate groups.

According to one advantageous embodiment of the fourth variant of the method of the invention, the species (E) used comprise compounds corresponding to at least one of the following formulae (IIIa) to (IIIe):

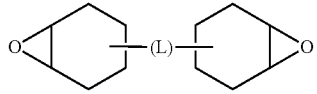
(IIIa)

R$^e$—(L)—R$'^e$
(IIIb)

O=C=N—(L)—N=C=O
(IIIc)

R$^e$—(L)—N=C=O
(IIId)

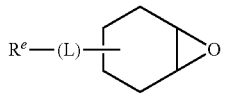
(IIIe)

where: —the (L) group is as defined above;
the R$^e$ and R$'^e$ groups, which may be identical or different, are each a group carrying an epoxy, thioepoxy or aziridine group (and preferably carrying an epoxy or thioepoxy group).

In the context of the fourth variant of the method of the invention, it is most commonly preferable to carry out step (e) with a (reactive groups/—OH or —SH groups) molar ratio of less than 50%, advantageously less than or equal to 40%, more preferably less than 30%, for example between 5% and 20%, which makes it possible in particular to prevent phenomena of gelling (or even setting to a solid) of the reaction medium in step (e) which might otherwise occur.

According to another particular aspect, subjects of the present invention are also the macromolecular species with a modified surface (in particular the polymers with a dendritic structure and with a modified surface and the inorganic particles with a modified surface) as can be obtained at the end of step (e) of the method of the invention.

In this context, specific macromolecular species which form the subject of the present invention include, in particular:
the species as obtained at the end of variant 1 of the method of the invention, which comprise macromolecular species carrying functions of formula —O—(C=O)—CR9=CR10R11, —O—CR10R11-CR9-COOR8, —S—(C=O)—CR9=CR10R11 and/or —S—CR10R11-CR9-COOR8,
where the R8, R9, R10 and R11 groups have the abovementioned meanings;
the species as obtained at the end of the abovementioned specific embodiments of variant 1, which comprise macromolecular species bridged to one another via divalent groups of formula —O—CR10R11-CR8-C(=O)—O—; —O—CR10R11-CR8-C(=O)—S—; S—CR10R11-CR8-C(=O)—O—; and/or —S—CR10R11-CR8-C(=O)—S—,
where the R8, R9, R10 and R11 groups have the abovementioned meanings;
the species as obtained at the end of other abovementioned specific embodiments of variant 1, which comprise macromolecular species carrying poly(meth)acrylate end chains;
the species as obtained at the end of variant 2 of the method of the invention, which comprise macromolecular species carrying functions corresponding to one or more of the following formulae:

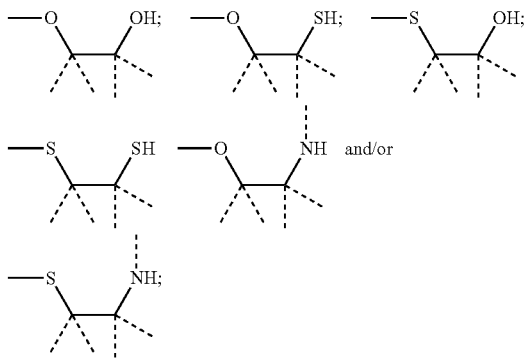

the species as obtained at the end of variant 4 of the method of the invention, including macromolecular species bridged to one another.

In general, the macromolecular species with a modified surface as are obtained at the end of step (e) of the method of the invention can be used as such, in particular as a filler or an active agent in various compositions, such as paints, varnishes, inks or adhesives. Where appropriate, the method of the invention advantageously comprises, at the end of step (e), a step of recovering the macromolecular species with a modified surface that have been formed, which can, for example, comprise a step of separating these species from possible impurities or solvents. Some macromolecular species with a modified surface according to the invention can in particular be used for the preparation of an anti-abrasive coating, as is illustrated in example 10 hereinafter.

Alternatively, the macromolecular species with a modified surface that are obtained at the end of step (e) can be used as starting material for the preparation of macromolecular species with an even further modified surface. In this case, the method of the invention comprises, following step (e), at least one step of modifying the surface of the modified particles as obtained at the end of step (e). When the macromolecular species with a modified surface that are obtained at the end of step (e) carry —OH and/or —SH functions, these species can be re-used as macromolecular species in a surface treatment step according to the invention, namely in the presence of a catalyst carrying a conjugated guanidine function and of reactive species of the abovementioned type.

Thus, according to one embodiment, the invention is a method in which step (e) results in macromolecular species with a modified surface which carry —OH and/or —SH functions, and the method comprises, following this step (e), at least one surface modification step (e'), in which the macromolecular species with a modified surface which carry —OH and/or —SH functions, at the end of step (e), are brought into contact with:

a catalyst (C) carrying a conjugated guanidine function, in particular of the abovementioned type; and reactive species (E) comprising reactive groups including:
(i) at least one group including an α,β-unsaturated carbonyl group C=C—C=O or an α,β-unsaturated thiocarbonyl group C=C—C=S; and/or
(ii) at least one heterocyclic group comprising from 3 to 5 ring members (preferably 3 or 4), selected from cyclic ethers, cyclic thioethers and aziridine rings (this group preferably being at least one epoxy, thioepoxy or aziridine group); and/or
(iii) at least one group selected from isocyanate —N=C=O or thioisocyanate —N=C=S groups, and trivalent groups of formula >C=CZ'—, where Z' is an electron-withdrawing group.

The catalyst (C) used in steps (e) and (e') is generally the same catalyst, which results in the method being easy to carry out.

In particular, steps (e) and (e') can be carried out in one reactor, without intermediate separation of the modified macromolecular species obtained at the end of step (e). This possibility of carrying out steps (e) and (e') according to a "one pot" mode constitutes yet another of the many advantages of the method of the present invention.

The abovementioned specific uses of the macromolecular species with a modified surface obtained at the end of step (e) also form the subject of the invention.

Various aspects and advantages of the invention will emerge further from the illustrative and nonlimiting exemplary embodiments of the invention, which are given hereinafter.

EXAMPLES

In the examples given hereinafter, the following compounds were used to carry out methods for preparing macromolecular species with a modified surface according to the present invention:

A bis-guanidine catalyst corresponding to the abovementioned formula (Ia):

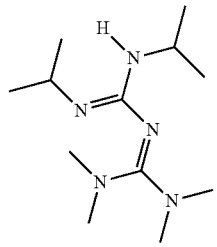 [SMILES: CC(C)/N=C(/N=C(N(C)C)N(C)C)NC(C)C]

which was prepared according to the following experimental protocol:
5 g (i.e. 43.41 mmol) of 1,1,3,3-tetramethylguanidine (Sigma Aldrich, Ref 241768, purity 99%) and 5.47 g (i.e. 43.34 mmol) of N,N'-diisopropylcarbodiimide (Acros Organics, Ref 115210250, purity 99%) were placed in a 100 ml single-neck round-bottomed flask. 20 ml of anhydrous DMF were added to the medium, with magnetic stirring and under an inert nitrogen atmosphere. The mixture was brought to 90° C. and stirred for 10 hours. The mixture was then concentrated on a rotary evaporator, and then recrystallized from ethyl ether, as a result of which 9.63 g of the desired catalyst of formula (Ia) were obtained in the form of an amorphous solid (92% yield).

A catalyst carrying two guanidine functions conjugated to one another, corresponding to the abovementioned formula I':

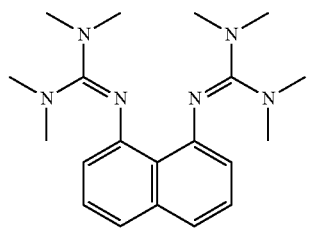

(catalyst marketed by the company Fluka under the reference 41541; purity>98.0%).

A monomer termed "monomer AB2", carrying an ester function and two alcohol functions, having the following formula:

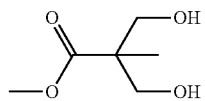

which was prepared according to the following experimental protocol:
In a 500 ml round-bottomed flask surmounted by a condenser, 5 g (i.e. 37.27 mmol) of 2,2-bis(hydroxymethyl)propionic acid (bis-MPA—Sigma-Aldrich Ref 106615, purity 98%) and 354 mg (i.e. 1.86 mmol) of para-toluenesulfonic acid (PTSA) monohydrate (Sigma Aldrich Ref 255378, purity>99%) were dissolved in 250 ml of methanol (Acros Organics, Ref 177150010, purity 99%, extra pure). The mixture obtained was brought to reflux for 12 h and then concentrated on a rotary evaporator. The residual oil was dissolved in 250 ml of ethyl ether, to which 10 g (i.e. 94.34 mmol) of sodium carbonate were added: the mixture was stirred at ambient temperature for 10 minutes and then filtered. The ethyl ether solution obtained was then washed three times with 100 ml of a saturated solution of NaHCO$_3$ and then dried over MgSO$_4$. After the ether had been evaporated off, the monomer AB2 was obtained in the form of 4.93 g of a colorless oil (89% yield).

3,4-Epoxycyclohexylmethyl-3,4-epoxycyclohexanecarboxylate, having the following formula:

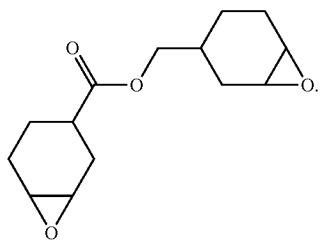 [SMILES: O=C(OCC1CCC2OC2C1)C1CCC2OC2C1]

(marketed by the company Sigma-Aldrich Ref 407208, purity 99%)

A methyl methacrylate, hereinafter denoted MMA (polymer marketed by Acros Organics, Ref 127140025, purity 99%+, stabilized with 15 ppm of MEHQ).

Trimethylol propane ethoxylate (hereinafter denoted "TMP ethoxylate"), corresponding to the following formula:

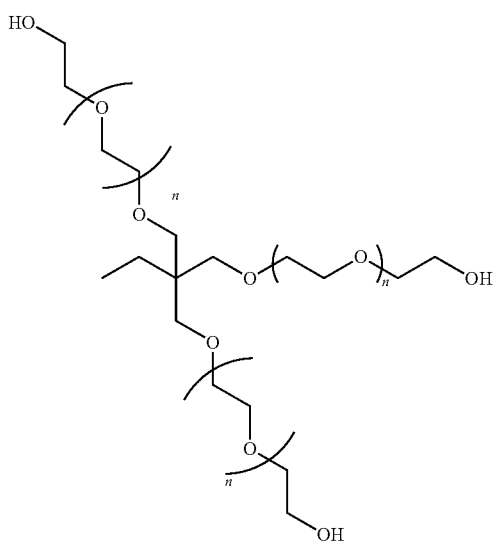

marketed by the company Sigma-Aldrich under the reference 409782 (Mn~730 g/mol; purity>97%).

Isophorone diisocyanate, having the formula:

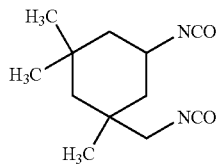

marketed by the company Fluka under the reference 59192.

Methyl acrylate, having the formula:

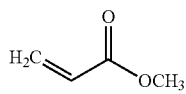

marketed by the company Sigma Aldrich under the reference M27301 (purity>99%, stabilized with monomethyl ether hydroquinone).

Ethanolamine (HO—CH$_2$—CH$_2$NH$_2$) marketed by the company ABCR (Ref AB110631, purity 98%).

2-Mercaptoethanol having the formula (HS—CH$_2$—CH$_2$NH$_2$) marketed by the company Sigma Aldrich under the reference M6250.

An oligomer CN981 (urethane acrylate oligomer marketed by the company Sartomer Europe).

Hexanediol diacrylate SR 238 marketed by the company Sartomer Europe.

Irgacure 819 (UV/visible photoinitiator marketed by the company Ciba Speciality Chemicals).

Example 1

Preparation of a Hyperbranched Acrylic Polymer (Polymer P1)

1.1 Synthesis of Polyester Polyol Polymers 126 g of the monomer AB2 were placed in a 250 ml jacketed reactor equipped with a mechanical stirring system and a condensation column. The medium was brought to 85° C. and 2.052 g of the catalyst of formula (Ia) were introduced. The mixture was left stirring (250 rpm) for 1 minute, and then placed under a vacuum of −760 mmHg, with stirring for 10 minutes.

1.2 Functionalization and Bridging of the Polyester Polyol Polymers (Preparation of Hyperbranched Structures)

Following the 10 minutes of reaction in step 1.1, the reaction medium was brought to atmospheric pressure under a nitrogen stream, the reaction temperature to 116° C. and the temperature of the fluid circulating in the condensation column to −20° C.

51 g of MMA were then gradually introduced into the medium. 0.820 g of the catalyst of formula (Ia) and 0.380 g of t-BuOK (cocatalyst) were then added, as were 50 mg of BHT (3,5-di-tert-butyl-4-hydroxytoluene), used as a stabilizer. The medium was left stirring (250 rpm) for 3 h.

1.23 g of the catalyst of formula (Ia) and 0.57 g of the t-BuOK cocatalyst were then added and the medium was left stirring for 11 h under the same conditions.

The reaction temperature was then brought down to 65° C. over 45 minutes, and then a vacuum of −760 mmHg was applied in the reactor. The reaction mixture was left stirring under these conditions for 2 h30.

1.3 Diurethane Bridging and Acetate Functionalization of the Hyperbranched Structures Obtained in Step 1.2

The reaction mixture was again placed under a nitrogen stream and the reaction temperature was increased to 70° C. 3.78 g of isophorone diisocyanate (Sigma-Aldrich Ref 59192, mixture of stereoisomers, purity 95%) was then gradually introduced while vigorously mixing the viscous reaction mixture.

After stirring for 1 h30, 34.76 g of acetic anhydride were added to the reaction mixture. The resulting mixture was left to react for 7 h and then the reaction temperature was brought back down to 35° C.

125 ml of water were then added to the reaction mixture and the polymer in suspension was extracted by settling out for 10 minutes. After settling out, the polymer was separated from the aqueous phase and was then re-extracted with 4×125 ml of distilled water, then 2×125 ml of 0.1N sulfuric acid and 2×125 ml of distilled water.

After drying under vacuum at 85° C. for 24 h, the polymer P1 was obtained in the form of 139 g of a viscous oil.

Example 2

Synthesis of an Acrylic Hyperbranched Polymer (Polymer P2)

2.1 Synthesis of Polyester Polyol Polymers 150 g of the monomer AB2 were placed in a 250 ml jacketed reactor equipped with a mechanical stirring system and a condensation column. The medium was brought to 85° C. and 2.44 g of the catalyst of formula (Ia) were introduced. The mixture was left stirring (250 rpm) for 1 minute, and then placed under a vacuum of −760 mmHg, with stirring for 10 minutes.

2.2 Functionalization and Bridging of the Polyester Polyol Polymers (Preparation of Hyperbranched Structures)

Following the 10 minutes of reaction in step 1.1, the reaction medium was brought to atmospheric pressure under a nitrogen stream, the reaction temperature to 116° C. and the temperature of the fluid circulating in the condensation column to −20° C.

40.54 g of MMA and 12.88 g of hexanediol dimethacrylate (Sigma-Aldrich, Ref 411736, purity 95%) were then gradually introduced, followed by 0.977 g of the catalyst of formula (Ia), and also 0.455 g of t-BuOK cocatalyst and 240 mg of BHT stabilizer. The medium was left stirring (250 rpm) for 3 h.

0.977 g of the catalyst of formula (Ia) and 0.455 g of t-BuOK cocatalyst were then added, and the medium was left stirring for 11 h under the same conditions.

The reaction temperature was then brought down to 65° C. over 45 minutes, and then a vacuum of −760 mmHg was applied in the reactor. The reaction mixture was left stirring under these conditions for 2 h30.

2.3 Acetate Functionalization of the Hyperbranched Structures Obtained in Step 2.2

The reaction mixture was placed again under a nitrogen stream and the reaction temperature was increased to 70° C. 62.08 g of acetic anhydride and also 371 mg of DMAP (4-dimethylaminopyridine) were then added to the reaction mixture. The medium was left to react for 7 h and then the reaction temperature was brought back down to 35° C.

150 ml of water were then added to the reaction mixture and the polymer in suspension was extracted by settling out for 10 minutes. After settling out, the polymer was separated from the aqueous phase and then re-extracted with 4×150 ml of distilled water, then 2×150 ml of 0.1N sulfuric acid and 2×150 ml of distilled water.

After drying under vacuum at 85° C. for 24 h, the polymer P2 was obtained in the form of 169 g of a viscous paste.

Example 3

Synthesis of an Acrylic Hyperbranched Polymer (Polymer P3)

3.1 Synthesis of Hyperbranched Polymers having a Polyester Polyol Core 7.615 g of TMP (trimethylolpropane marketed by Acros Organics, Ref 164650025, purity 98%) and 8.4 g of the monomer AB2 are placed in a 250 ml jacketed reactor equipped with a mechanical stirring system, a condensation column and a dropping funnel containing 117.6 g of the monomer AB2.

The medium was brought to 85° C., and 0.137 g (Acros Organics, Ref 164650025, purity 98%) was introduced. The mixture was stirred for 1 minute (250 rpm) and then placed under a vacuum of −760 mmHg. The mixture was then left stirring for 5 minutes and was then again placed at atmospheric pressure.

The 117.6 g of the monomer AB2 contained in the dropping funnel were then run into the reactor and 1.915 g of the catalyst of formula (Ia) were again added. The medium was then left stirring under vacuum (−760 mmHg) for 10 minutes.

3.2 Bridging of the Polyester Polyol Polymers with a Diepoxide Compound

The medium derived from the preceding stage was brought to atmospheric pressure under a nitrogen stream, and the reaction temperature was brought to 110° C., and the temperature of the fluid circulating in the condensation column was brought to −5° C.

6.015 g of 3,4-epoxycyclohexylmethyl-3,4-epoxycyclohexanecarboxylate (Sigma-Aldrich Ref 407208, purity>99%) were then added to the medium. The viscous mixture was stirred for 5 h.

42.56 g of MMA, and then 1.026 g of the catalyst of formula (Ia), and also 0.478 g of t-BuOK cocatalyst and 200 mg of BHT stabilizer were then gradually added to the medium. The medium was stirred (250 rpm) for 3 h.

1.026 g of the catalyst of formula (Ia) and 0.478 g of t-BuOK cocatalyst were then added, and the medium was stirred for 11 h under the same conditions.

The reaction temperature was brought down to 65° C. over 45 minutes. The reaction mixture was then again placed under vacuum (−760 mmHg) and was stirred for 2 h30.

3.3 Acetate Functionalization of the Hyperbranched Structures Obtained in Step 3.2

The reaction mixture derived from step 2.2 was again placed under a nitrogen stream and the reaction temperature brought to 70° C. 42.56 g of acetic anhydride were added to the reaction mixture, as were 312 mg of DMAP. The medium was left to react for 7 h and then the reaction temperature was brought back down to 35° C.

125 ml of water were then added to the reaction mixture and the polymer in suspension was extracted by settling out for 10 minutes. After settling out, the polymer was separated from the aqueous phase and was then re-extracted with 4×125 ml of distilled water, then 2×125 ml of 0.1N sulfuric acid and 2×125 ml of distilled water.

After drying under vacuum at 85° C. for 24 h, the polymer P3 was obtained in the form of 153 g of a viscous oil.

Example 4

Synthesis of an Epoxy Hyperbranched Polymer (Polymer P4)

4.1 Synthesis of Hyperbranched Polymers having a Polyester Polyol Core 7.615 g of TMP (trimethylolpropane—Acros Organics, Ref 164650025, purity 98%) and 8.4 g of the monomer AB2 were placed in a 250 ml jacketed reactor equipped with a mechanical stirring system, a condensation column and a dropping funnel containing 117.6 g of the monomer AB2.

The medium was brought to 85° C., and 0.137 g of the catalyst of formula (Ia) was introduced. The mixture was stirred for 1 minute (250 rpm) and then placed under a vacuum of −760 mmHg. The mixture was then left stirring for 5 minutes, and was then again placed at atmospheric pressure.

The 117.6 g of the monomer AB2 contained in the dropping funnel were then run into the reactor and a further 1.915 g of the catalyst of formula (Ia) were added. The medium was then left stirring under vacuum (−760 mmHg) for 10 minutes.

4.2 Functionalization of the Polyester Polyol Polymers with a Diepoxide Compound The medium derived from step 4.1 was brought to atmospheric pressure under a nitrogen stream, the reaction temperature to 110° C. and the temperature of the fluid circulating in the condensation column to −5° C.

85.13 g of 3,4-epoxycyclohexylmethyl-3,4-epoxycyclohexanecarboxylate were then added to the viscous medium, as were 2.052 g of the catalyst of formula (Ia). The mixture obtained was left stirring for 12 h.

125 ml of water were then added to the reaction mixture and the polymer in suspension was extracted by settling out for 10 minutes. After settling out, the polymer was separated from the aqueous phase and was then re-extracted with 4×125 ml of distilled water, then 2×125 ml of 0.1N sulfuric acid and 2×125 ml of distilled water.

After drying under vacuum at 85° C. for 24 h, the polymer P4 was obtained in the form of 181 g of a viscous oil.

Example 5

Synthesis of a "Core-Shell" Nanomaterial having an Inorganic Core and a Polymer Shell In this example, the following compounds were used:

precursor 1

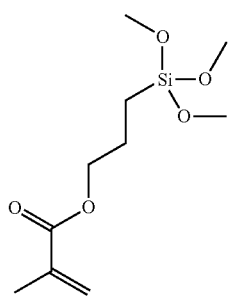

-continued

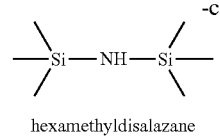

hexamethyldisalazane (The precursor 1 is a 3-(methacryloyloxy)propyltrimethoxysilane at 97% marketed by ABCR (Ref AB11767); the hexamethyldisilazane is the product sold by the company Fluka (Ref 52620, purity>98%))

150 ml of distilled water were placed in a 500 ml reactor equipped with a mechanical stirring paddle and a Vigreux condenser column, the temperature of the reaction medium being 40° C. 10 g of tetramethylorthosilicate (Sigma Aldrich, Ref 341436, purity>99%) were added and the medium was left stirring for 1 hour.

A sol of silica particles was thus obtained.

12 g of the precursor 1 as defined above, dissolved in 10 ml of ethanol, were then added and the medium was left stirring for 30 minutes.

2 g of hexamethyldisilazane (Fluka Ref 52620, purity>98%) were then gradually added over a period of 10 minutes. The temperature of the reaction medium was then brought to 60° C. After stirring for 45 minutes, the reactor was placed under vacuum (at 100 mbar for 5 h, then at 13 mbar for 3 h).

21.45 g of monomer AB2 were then added to the reaction medium, at atmospheric pressure. The temperature of the reaction medium was brought to 90° C., and the mixture was left stirring for 45 minutes under an inert atmosphere at atmospheric pressure.

232 mg of the catalyst $C_1$ of formula (Ia) were then added, and the temperature was brought to 120° C.

Functionalization of the silica particles was thus obtained according to scheme 1 below:

Scheme 1

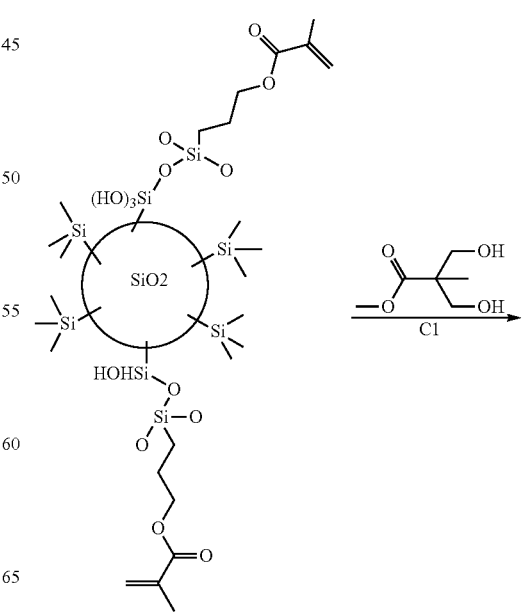

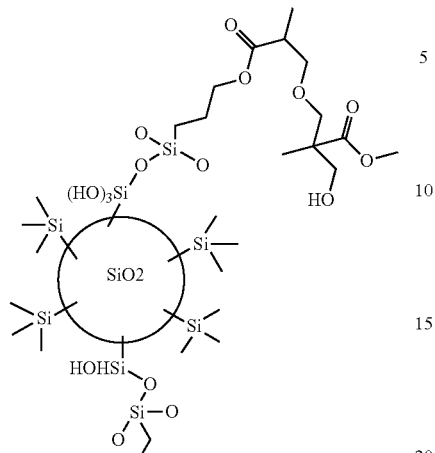

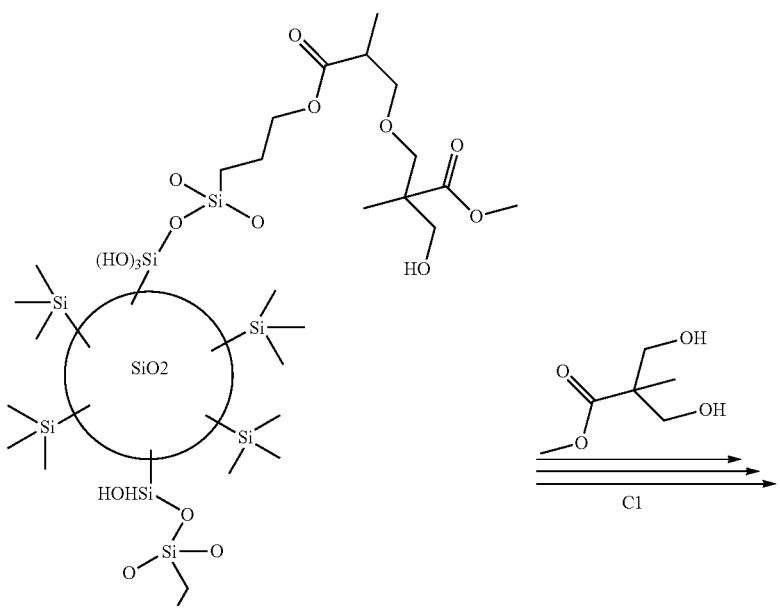

After stirring for 12 hours, the reaction mixture was cooled to 90° C. and 69 g of monomer AB2 and 2.24 g of the catalyst of formula (Ia) were introduced into the reactor, at atmospheric pressure. The pressure was gradually reduced to 13 mbar, with stirring. The medium was left stirring for 15 minutes, during which time the viscosity of the mixture increased.

The reaction described in scheme 2 below was then, schematically, obtained:

Scheme 2

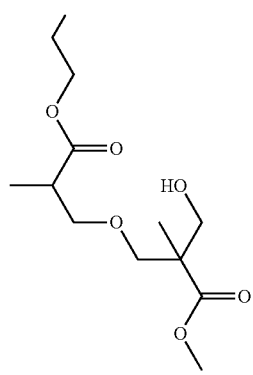

-continued

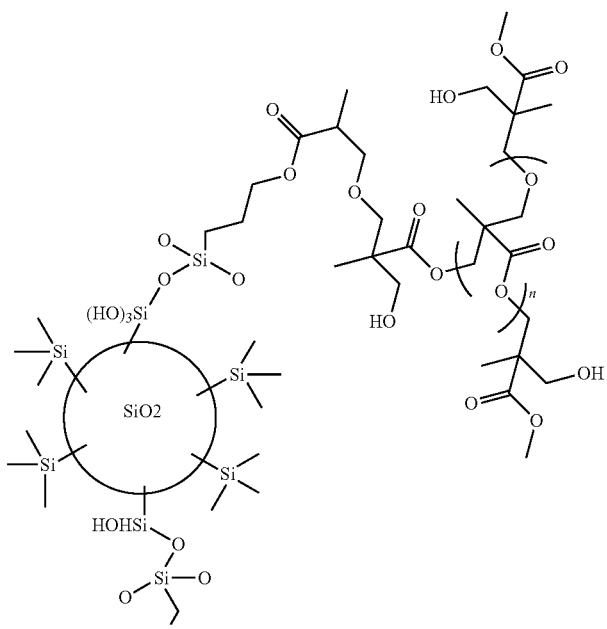

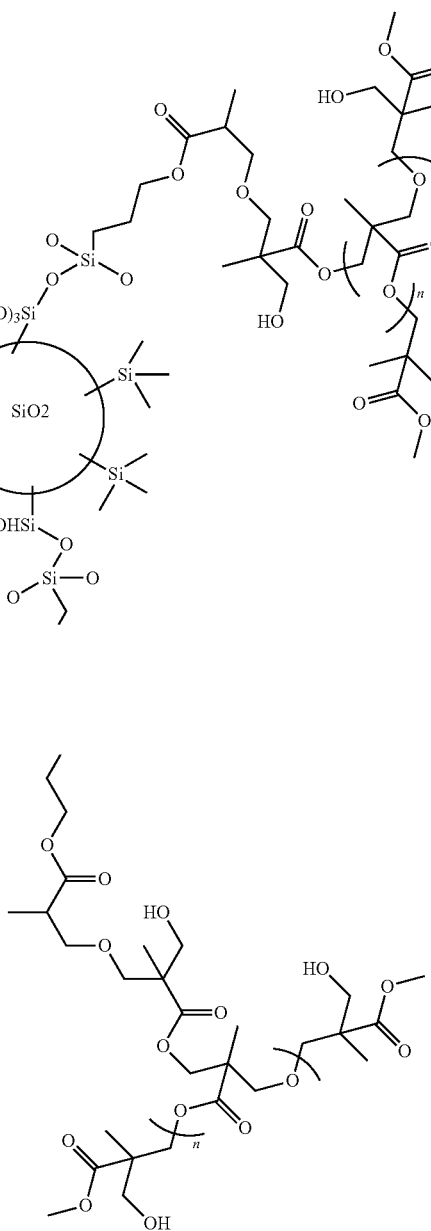

61.20 g of MMA and also 150 mg of BHT stabilizer and 2.24 g of bis-guanidine catalyst were then added to the reaction mixture. After homogenization, the mixture was flushed with nitrogen and kept under an inert atmosphere at atmospheric pressure, and the temperature was brought to 120° C. The reaction mixture was stirred under these conditions for 15 h.

The temperature of the medium was then brought back down to 70° C. and a distillation system with a rectifier was fitted to the top of the Vigreux column. The pressure was brought down to 70 mbar for 5 h and then to 13 mbar for 3 h.

The reaction of scheme 3 below (in which the left-hand formula represents the modified silica particles obtained at the end of scheme 2) was thus obtained:

Scheme 3

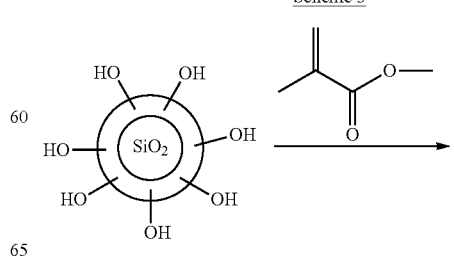

-continued

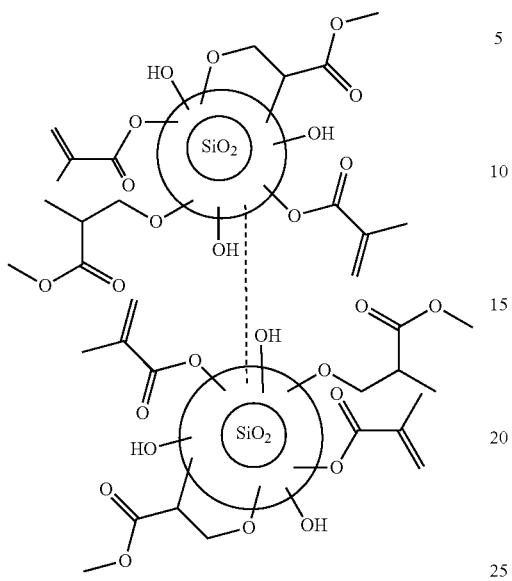

Example 6

Synthesis of a "Core-Shell" Nanomaterial having an Inorganic Core and a Polymer Shell In this example, modified and crosslinked silica particles having structures close to those obtained in the preceding example 6 were prepared.

A sol of silica particles was prepared as in the preceding example (in a 500 ml reactor equipped with a mechanical stirring paddle and a Vigreux condenser column, by introducing 150 ml of distilled water and 10 g of tetramethylorthosilicate left stirring for 1 hour at 40° C.).

8 g of 3-aminopropyltriethoxysilane dissolved in 8 ml of ethanol were then added and the resulting mixture was again left stirring for 30 minutes.

1.5 g of hexamethyldisilazane was then gradually added over a period of 10 minutes, and the temperature of the reaction medium was then brought to 50° C. After stirring for 1 hour, the assembly was placed under vacuum at 100 mbar for 7 h and then at 13 mbar for 3 h, at a temperature of 75° C.

90.45 g of monomer AB2 were then added to the reaction medium, at atmospheric pressure. The temperature of the reaction medium was brought to 90° C. and the mixture obtained was left stirring for 45 minutes under an inert atmosphere at atmospheric pressure.

2.93 g of the catalyst of formula (Ia) were then added and the assembly was placed under vacuum (13 mbar) for 20 minutes.

61.20 g of MMA and also 150 mg of BHT stabilizer and 2.24 g of the catalyst of formula (Ia) were then added to the reaction medium.

After homogenization, the mixture was flushed with nitrogen and kept under an inert atmosphere (atmospheric pressure), and the temperature was brought to 120° C. The reaction mixture obtained was left stirring for 15 h.

The temperature was then brought back down to 70° C., and a distillation system with a rectifier was fitted to the top of the Vigreux column. The pressure was reduced to 70 mbar for 5 h and then to 13 mbar for 3 h.

A viscous paste was thus obtained, and was washed three times with 150 ml of ethyl ether, and then twice with 150 ml of a molar aqueous solution of sulfuric acid and, finally, with three times 150 ml of distilled water. After drying under a vacuum of 13 mbar for 12 h, 101 g of a transparent viscous resin were recovered.

Example 7

Synthesis of an Acrylate-Functionalized Hyperbranched Aliphatic Polyurethane in the Presence of the Catalyst (I')

50 g of TMP ethoxylate and 546 mg of catalyst of formula (I') defined later in the present description were placed in a 250 ml jacketed reactor equipped with a mechanical stirring system, a Vigreux condensation column and a dropping funnel. 6.1 g of isophorone diisocyanate were placed in the funnel and the assembly was placed under an inert atmosphere. The temperature was brought to 70° C. and the medium was stirred at 250 rpm. All of the isophorone diisocyanate was then introduced dropwise over a period of 10 minutes, as a result of which a rapid increase in the viscosity of the mixture was obtained. After stirring for 30 minutes, the temperature was brought to 85° C.

A hyperbranched polyurethane polyol was thus obtained.

13 g of methyl acrylate and 20 mg of BHT were added to the dropping funnel and the assembly was again placed under an inert atmosphere. The mixture of methyl acrylate and BHT was gradually added. After complete homogenization of the polymer and the methyl acrylate, the temperature was increased to 108° C. The mixture obtained was kept under an inert atmosphere at atmospheric pressure and with stirring for 9 h.

The temperature of the medium was then brought back down to 70° C. and a distillation system with a rectifier was fitted to the top of the Vigreux column. The pressure was brought down to 200 mbar for 1 h, then to 160 mbar for 1 h, then to 120 mbar for 1 h, then to 70 mbar for 1 h, then to 50 mbar for 30 minutes and, finally, to 25 mbar for 1 h30.

64.55 g of a brownish-violet transparent resin which is a hyperbranched polyurethane, the ends of which have been partially functionalized with acrylate groups and groups derived from Michael addition of the peripheral hydroxyl groups on the methyl acrylate, were thus obtained.

Example 8

Synthesis of a Core-Shell Hybrid Material having an Inorganic Core and a Polymer Shell 150 ml of distilled water were placed in a 500 ml reactor equipped with a mechanical stirring paddle and a Vigreux condenser column, the temperature of the reaction medium being 40° C. 12 g of tetramethylorthosilicate (Sigma Aldrich, Ref 341436, purity>99%) were added and the medium was left stirring for 1 hour.

A sol of silica particles was thus obtained.

6 g of the precursor 1 as defined in example 5, dissolved in 5 ml of ethanol, were then added and the medium was left stirring for 30 minutes.

1.5 g of hexamethyldisilazane (Fluka ref 52620, purity>98%) were then gradually added over a period of 10 minutes. The temperature of the reaction medium was then brought to 60° C. After stirring for 45 minutes, the reactor was placed under vacuum (at 100 mbar for 5 h, then at 13 mbar for 0 h30).

1.22 g of ethanolamine were then added to the reaction medium, and then the temperature was brought to 50° C. The reaction medium was left to stir for 1 h30. The reaction carried out is represented in scheme 4 below:

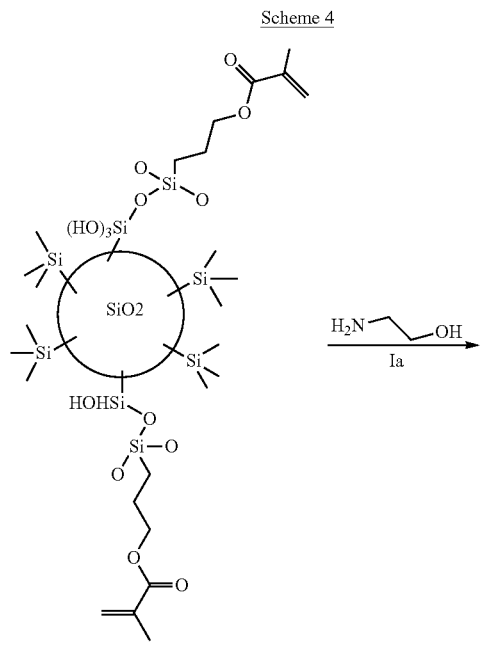

Scheme 4

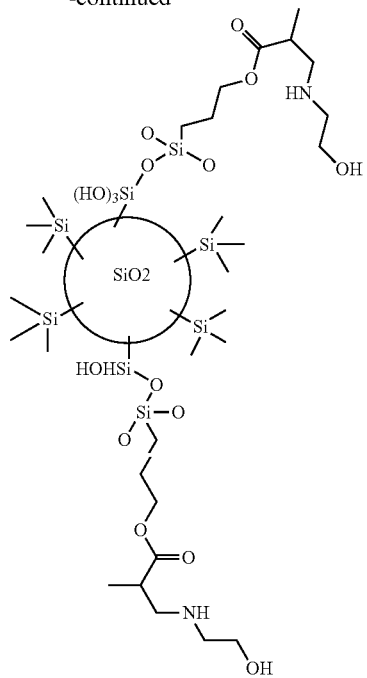

69 g of monomer AB2 were then added to the reaction medium. The temperature of the medium was brought to 90° C. and the mixture was left stirring for 30 minutes. While leaving the medium stirring, the pressure was gradually reduced to 20 mbar for 1 h.

2.24 g of the catalyst (Ia) were then added and the temperature was brought to 100° C. The pressure was gradually reduced to 30 mbar, with stirring, and the medium was left stirring for 50 minutes, which resulted in an increase in the viscosity.

The reaction carried out is represented in scheme 5 below:

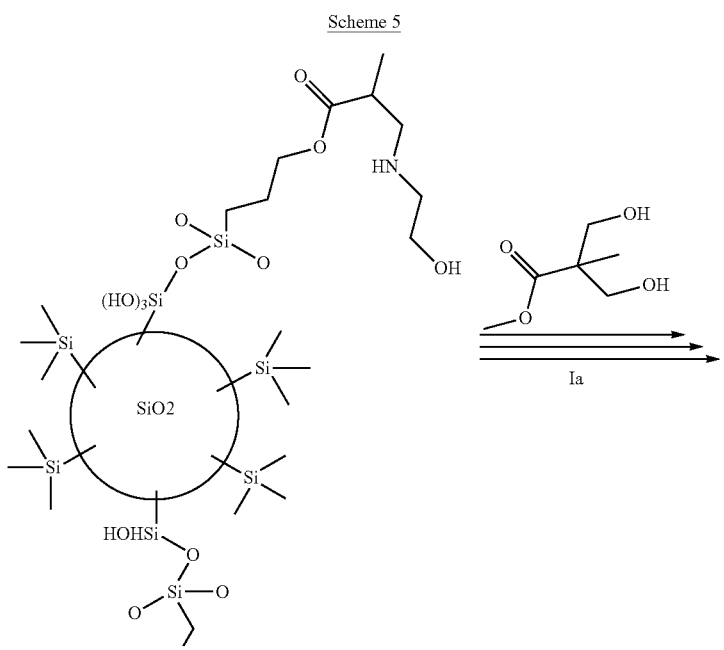

Scheme 5

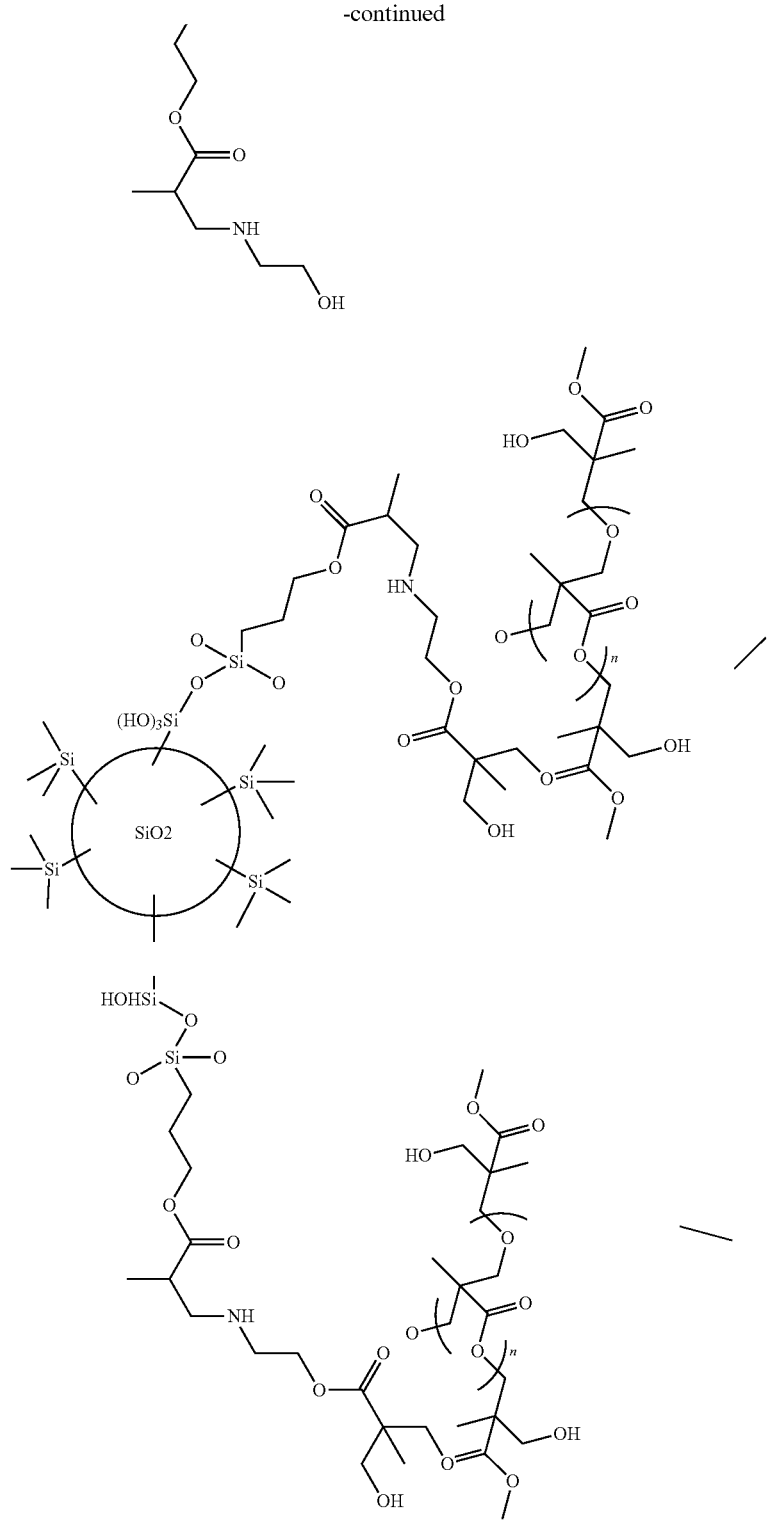

52 g of methyl acrylate and also 150 mg of BHT stabilizer and 1.1 g of catalyst (Ia) were then added to the reaction mixture. After homogenization, the mixture was flushed with nitrogen and maintained under an inert atmosphere under atmospheric pressure. The temperature was then brought to 110° C. and the reaction mixture was left stirring under these conditions for 10 h.

The temperature of the reaction medium was then brought back down to 70° C. and a distillation system with a rectifier was fitted to the top of the Vigreux column. The pressure was then brought down to 200 mbar for 1 h, then to 160 mbar for 1 h, then to 120 mbar for 1 h, then to 70 mbar for 1 h, then to 50 mbar for 30 minutes and finally, to 25 mbar for 1 h30.

The formulation of the particles with a modified structure was thus obtained according to scheme 6 below:

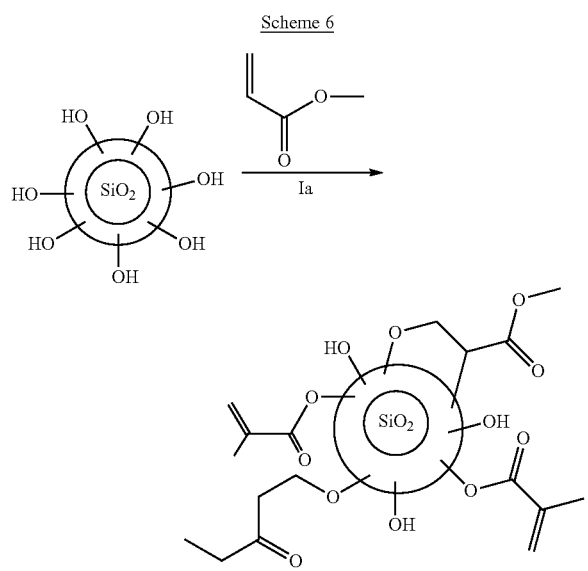

Scheme 6

The particles with a modified surface that are thus ultimately obtained are in the form of 104 g of a lightly colored (yellow) transparent viscous resin. Characterization of this product by TGA (thermogravimetric analysis) shows that it contains 11% by mass of inorganic material.

Example 9

Synthesis of a Core-Shell Material having an Inorganic Core and a Polymer Shell Comprising Peripheral Groups of —SCH$_2$CH$_2$OH Type (Modification of the Surface of the Material of Example 8)

6.70 g of the nanomaterial prepared in example 8 are placed in a 25 ml single-neck round-bottomed flask which has a magnetic bar.

330 mg of 2-mercaptoethanol and also 15 mg of catalyst (Ia) were added to this mixture. A Vigreux condensation column was mounted on top of the single neck and the assembly was placed under an inert atmosphere.

The reaction medium was stirred using a magnetic stirrer plate, and the reaction mixture was brought to a temperature of 106° C. The reaction medium was left stirring for 10 h and was then placed under a vacuum of 25 mbar for 15 minutes. The temperature was then brought back down to ambient temperature.

At the end of these steps, 7.05 g of a transparent resin are obtained.

The treatment carried out in the present example results in a substantial disparity in the peripheral acrylate groups of the material of example 8, which are replaced with —SCH$_2$CH$_2$OH groups (obtained by Michael addition of 2-mercaptoethanol on the acrylates).

Example 10

Anti-Abrasive Formulation Comprising the Composite Material of Example 8

A photopolymerisable formulation was prepared from the composite material of example 8 according to the protocol below.

The following are successively placed, at 25° C. (away from any source of UV and/or visible light), in a 1 L stainless steel, jacketed reactor:

100 g of the composite material obtained in example 8;
200 g of CN981 (urethane acrylate oligomer);
200 g of SR238 (hexanediol diacrylate);
5 g of Irgacure 819 (UV/visible photoinitiator).

The temperature was brought to 50° C. and mixing was carried out at 250 rpm for 30 minutes. The mixture obtained, which contains 2.2% of perfectly dispersed silica nanoparticles, is completely transparent and homogeneous. The viscosity at 25° C. of the formulation, as measured using an AR 2000 rheometer from AT-Instruments, is 50 cPs.

The formulation obtained was spread on a sheet of Makrolon polycarbonate (Bayer) 5 cm×5 cm in size, according to the "flow coating" technique. UV irradiation of the film obtained (Fusion UV bench-top UV system equipped with an H bulb) gave, on the sheet, a completely crosslinked film which can be used, in particular, as an anti-abrasive protective coating.

The invention claimed is:

1. A method for preparing macromolecular species with a modified surface, comprising a step (e) in which macromolecular species (M) carrying —OH, or —SH, or —OH and —SH functions is brought into contact with
  a catalyst (C) carrying at least one conjugated guanidine function and
  reactive species (E) comprising at least one reactive group selected from the group consisting of
    i) an α,β-unsaturated carbonyl group C═C—C═O, an α,β-unsaturated thiocarbonyl group C═C—C═S,
    ii) a heterocyclic group comprising from 3 to 5 ring members and selected from the group consisting of cyclic ethers, cyclic thioethers, and aziridine rings,
    iii) an isocyanate group —N═C═O, a thioisocyanate group —N═C═S, and a trivalent group of formula >C═CZ— where Z is an electron-withdrawing group, and
    iv) mixtures thereof.

2. The method of claim 1, wherein the catalyst (C) has a conjugated bis-guanidine function and the following formula (I):

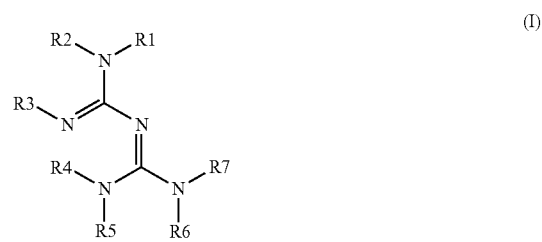

where each of R1 to R7 is, independently,
  a hydrogen atom,
  a cyano group —CN,
  a linear or branched alkyl, alkenyl, or alkynyl group of 1 to 12 carbon atoms optionally substituted with an alkoxy group,
  a cycloalkyl group of 6 to 18 carbon atoms optionally substituted with at least one alkyl or alkoxy group,
  an aryl group of 6 to 18 carbon atoms optionally substituted with at least one alkyl or alkoxy group, an optionally aromatic heterocycle containing one or more heteroatoms selected from the group consisting of S, O, and N,
an alkylaryl or arylalkyl group of 8 to 18 carbon atoms where the aryl is optionally substituted with an alkyl or alkoxy group,
an ester, amide, or carbamate group, or
a polymer chain optionally carrying guanidine groups.

3. The method of claim 2, wherein the catalyst (C) carries two guanidine functions conjugated to one another.

4. The method of claim 2, wherein the macromolecular species (M) is a polymer having a dendritic structure carrying —OH, or —SH, or —OH and —SH groups.

5. The method of claim 2, wherein the macromolecular species (M) is comprise a polymer (P) having a dendritic structure carrying peripheral —OH, or —SH, or —OH and —SH groups obtained by a process comprising the step of
polymerizing monomers having a functionality greater than 2 in the presence of catalyst (C), the monomers comprising
at least two —OH or —SH functions and at least one reactive function or
at least two reactive functions and at least one —OH or —SH function,
wherein the reactive functions carry an α,β-unsaturated carbonyl group C=C—C=O, an α,β-unsaturated thiocarbonyl group C=C—C=S, a cyclic ether group of 3 to 5 ring members, a cyclic thioether group of 3 to 5 ring members, an aziridine ring of 3 to 5 ring members, an isocyanate group —N=C=O, a thioisocyanate group —N=C=S, a trivalent group of formula >C=CZ— where Z is an electron-withdrawing group, an ester function, a thioester function, an amide function, a carbamate function, a thiocarbamate function, a phosphate function, or a sulfate function.

6. The method of claim 1, wherein the macromolecular species (M) comprise inorganic particles having —OH, or —SH, or —OH and —SH surface groups.

7. The method of claim 1, wherein the molar ratio of catalyst (C) relative to the total reactive groups present on the reactive species (E) is between 0.05% and 10%.

8. The method of claim 1, wherein the reactive species (E) is selected from the group consisting of compounds carrying at least one α,β-unsaturated carbonyl group C=C—C=O and having the formula (II)

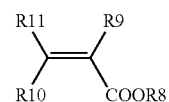

(II)

wherein
R8 is an alkyl group of 1 to 12 carbon atoms,
R9 is a hydrogen atom, a linear or branched alkyl group, or a linear or branched, saturated or unsaturated, hydrocarbon-based chain optionally completely or partially cyclized, optionally substituted and optionally interrupted with one or more heteroatoms selected from the group consisting of N, O, S, P and Si, and
R10 and R11 are, independently, a hydrogen atom or an alkyl, alkenyl, cycloalkyl, aryl, alkylaryl, or arylalkyl group of 1 to 18 carbon atoms.

9. The method of claim 8, wherein
step (e) is carried out at a pressure of from $7 \times 10^4$ to $10^5$ Pa or
step (e) is carried out at a molar ratio of total reactive groups present on the species (E) relative to the —OH, or —SH, or —OH and —SH groups carried by the species (M) of at most 75%,
to effect functionalization of the species (M) together with coupling between the species (M).

10. The method of claim 8, wherein
step (e) is carried out at a pressure greater than $2 \times 10^5$ Pa or
step (e) is carried out at a molar ratio of total reactive groups present on the species (E) relative to the —OH or —SH groups carried by the species (M) of at least 100%,
to effect functionalization of the species (M) essentially without coupling between the species (M).

11. The method of claim 8, wherein step (e) is carried out in the presence of an anionic polymerization cocatalyst, to effect formation of poly(meth)acrylate end chains on the species (M) at the end of the step (e).

12. The method of claim 1, wherein the reactive species (E) are compounds comprising heterocyclic groups comprising 3 to 5 ring members, the groups being selected from cyclic ethers, cyclic thio ethers, and aziridine rings, these reactive species (E) being compounds comprising an epoxy, thioepoxy, or aziridine group having, respectively, the formulae

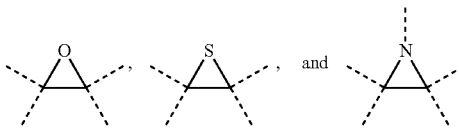

which epoxy, thioepoxy, or aziridine groups react with the —OH, or —SH, or —OH and —SH groups present on the species (M) to effect formation on the species (M), respectively, of functions having the formulae

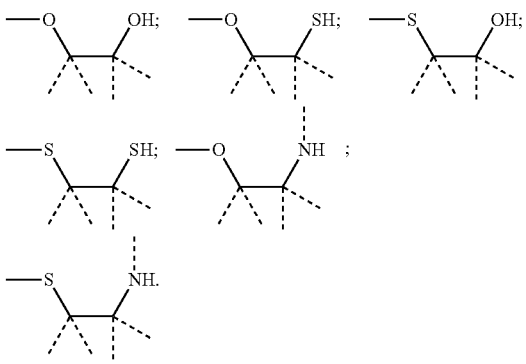

13. The method of claim 1, wherein the reactive species (E) comprises difunctional compounds carrying at least two groups selected from the group consisting of an α,β-unsaturated carbonyl group C=C—C=O, an α,β-unsaturated thiocarbonyl group C=C—C=S, and a mixture thereof, a heterocyclic group of 3 to 5 ring members selected from the group consisting of cyclic ethers, cyclic thioethers, and aziridine rings, an isocyanate group —N=C=O, a thioisocyanate group —N=C=S, and a group of formula >C=CZ— where Z is an electron-withdrawing group, which difunctional compounds effect bridging between the species (M).

14. A macromolecular species having a modified surface obtained by the method of claim 4.

15. A macromolecular species of claim 14, which is a filler or an active agent in a paint, varnish, ink, or adhesive composition, or a starting material.

16. A macromolecular species having a modified surface obtained by the method of claim 5.

17. A macromolecular species of claim 16, which is a filler or an active agent in a paint, varnish, ink, or adhesive composition, or a starting material.

18. A macromolecular species with a modified surface obtained by the method of claim 6.

19. A macromolecular species of claim 18, which is a filler or an active agent in a paint, varnish, ink, or adhesive composition, or a starting material.

20. The method of claim 1, wherein the macromolecular species (M) comprise polymers having a dendritic structure initially carrying at least —OH groups.

* * * * *